US012615685B2

(12) United States Patent
Abedini et al.

(10) Patent No.: US 12,615,685 B2
(45) Date of Patent: Apr. 28, 2026

(54) KEEP-ALIVE SIGNAL FOR NETWORK ENERGY SAVING IN A WIRELESS NETWORK

(71) Applicant: QUALCOMM Incorporated, San Diego, CA (US)

(72) Inventors: Navid Abedini, Basking Ridge, NJ (US); Jianghong Luo, Skillman, NJ (US); Keerthi Priya Dasala, Bridgewater Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/308,552

(22) Filed: Apr. 27, 2023

(65) Prior Publication Data

US 2023/0354458 A1      Nov. 2, 2023

Related U.S. Application Data

(60) Provisional application No. 63/336,600, filed on Apr. 29, 2022.

(51) Int. Cl.
*H04W 76/00* (2018.01)
*H04W 16/28* (2009.01)
(Continued)

(52) U.S. Cl.
CPC ........... *H04W 76/25* (2018.02); *H04W 16/28* (2013.01); *H04W 56/0015* (2013.01)

(58) Field of Classification Search
None
See application file for complete search history.

(56) References Cited

U.S. PATENT DOCUMENTS

| | | | | |
|---|---|---|---|---|
| 7,218,623 B1 * | 5/2007 | Proctor, Jr. | ....... | H04W 72/0473 |
| | | | | 370/335 |
| 2012/0173901 A1 * | 7/2012 | Soliman | .............. | H04W 88/182 |
| | | | | 713/320 |

(Continued)

FOREIGN PATENT DOCUMENTS

| | | | | |
|---|---|---|---|---|
| CN | 105307139 A | * | 2/2016 | |
| EP | 2587712 A2 | | 5/2013 | |
| WO | WO-2012062766 A1 | * | 5/2012 | ............ H04W 72/20 |

OTHER PUBLICATIONS

International Search Report and Written Opinion—PCT/US2023/020330—ISA/EPO—Aug. 7, 2023.

(Continued)

*Primary Examiner* — Gerald A Smarth
(74) *Attorney, Agent, or Firm* — QUALCOMM Incorporated

(57) ABSTRACT

Aspects of the disclosure provide techniques and apparatuses for using keep-alive signaling for network energy saving in an idle mode. A network entity can transmit a keep-alive signal (KAS) to reduce the energy consumption of a network when the network is in an idle mode. In some aspects, the KAS can be a reduced synchronization signal block (SSB) that is sent more frequently than a full SSB. In some aspects, the KAS can have a different beam sweeping pattern and/or beam width from the full SSB.

28 Claims, 22 Drawing Sheets

(51) Int. Cl.
*H04W 56/00* (2009.01)
*H04W 76/25* (2018.01)

(56) References Cited

U.S. PATENT DOCUMENTS

2021/0274588 A1    9/2021   Ding et al.
2022/0400451 A1    12/2022   Luo et al.

OTHER PUBLICATIONS

Qualcomm Incorporated: "Uplink Based Mobility Physical Channels", 3GPP TSG-RAN WG1 #86, R1-166387, 3rd Generation Partnership Project, Mobile Competence Centre, 650, Route Des Lucioles, F-06921, Sophia-Antipolis Cedex, France, vol. RAN WG1, No. Gothenburg, Sweden, Aug. 22, 2016-Aug. 26, 2016, Aug. 21, 2016, 5 pages, XP051125354, p. 6, line 23—p. 7, line 6, paragraphs [0002], [03. 3].

* cited by examiner

1100

- PSS power offset
- Beam sweep pattern
- PSS repetition
- Quasi colocation (QCL) relation b/w KAS and SSB
- Periodicity and offset

1600

1602

Send a keep-alive signal (KAS) periodically

1604

Send a periodic synchronization signal after sending a plurality of KASs and skipping the KAS in a period for sending the periodic synchronization signal, the KAS consuming less communication resources than the synchronization signal.

1700

1702

Transmit a synchronization signal block (SSB) including a plurality of signals including at least one synchronization signal and a control channel

1704

Transmit a keep-alive signal (KAS) including a subset of the plurality of signals included in the SSB

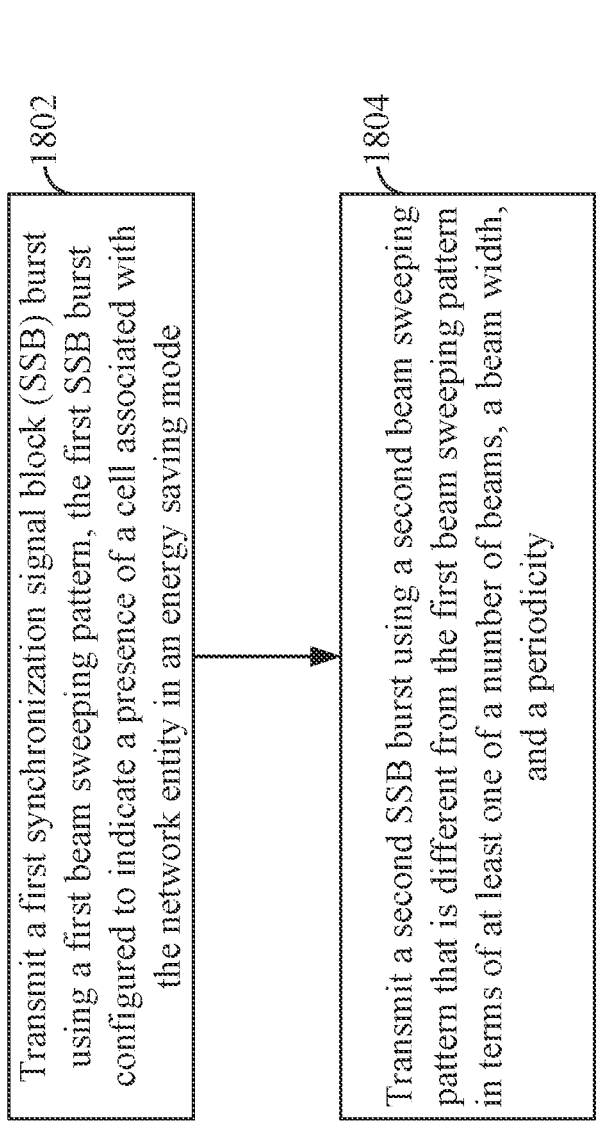

1800

Transmit a first synchronization signal block (SSB) burst using a first beam sweeping pattern, the first SSB burst configured to indicate a presence of a cell associated with the network entity in an energy saving mode

1802

Transmit a second SSB burst using a second beam sweeping pattern that is different from the first beam sweeping pattern in terms of at least one of a number of beams, a beam width, and a periodicity

Receive a keep-alive signal (KAS) periodically

2004

Receive a synchronization signal after receiving a plurality of KASs and skipping the KAS in a period for receiving the synchronization signal, the KAS consuming less communication resources than the synchronization signal.

2100

2102

Receive, from a network entity, a synchronization signal block (SSB) including a plurality of signals including at least one synchronization signal and a control channel

2104

Receive, from the network entity, a keep-alive signal (KAS) including a subset of the plurality of signals included in the SSB

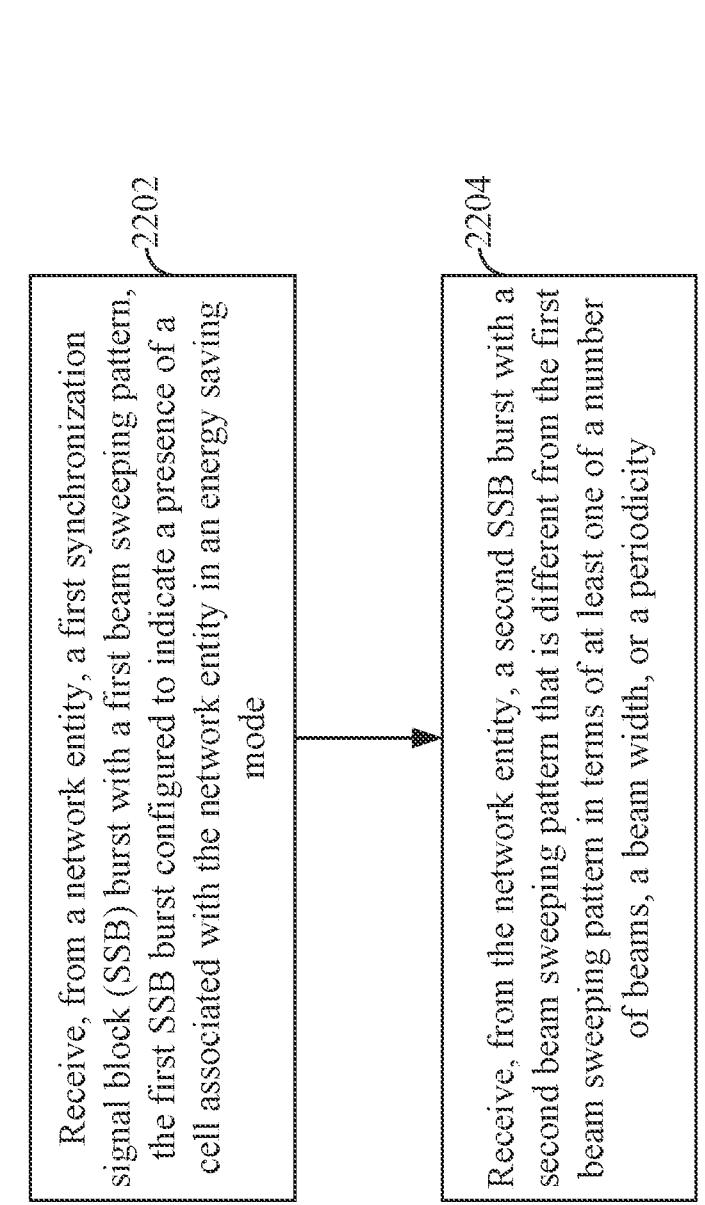

2200

2202

Receive, from a network entity, a first synchronization signal block (SSB) burst with a first beam sweeping pattern, the first SSB burst configured to indicate a presence of a cell associated with the network entity in an energy saving mode

2204

Receive, from the network entity, a second SSB burst with a second beam sweeping pattern that is different from the first beam sweeping pattern in terms of at least one of a number of beams, a beam width, or a periodicity

FIG. 22

KEEP-ALIVE SIGNAL FOR NETWORK ENERGY SAVING IN A WIRELESS NETWORK

CROSS-REFERENCE TO RELATED APPLICATIONS

The present Application for Patent claims priority to U.S. Provisional Application No. 63/336,600, filed Apr. 29, 2022, and assigned to the assignee hereof and hereby expressly incorporated by reference herein as if fully set forth below and for all applicable purposes.

TECHNICAL FIELD

The technology discussed below relates generally to wireless communication systems, and more particularly, to techniques and apparatuses for keep-alive signaling for network energy saving.

INTRODUCTION

Wireless communication systems are widely deployed to provide various telecommunication services such as telephony, video, data, messaging, and broadcasts. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. In a 5G network, a network entity can transmit various signals to enable a user equipment to synchronize and connect to the network. The network entity may employ techniques to reduce network side power consumption.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure provide techniques and apparatuses for using keep-alive signaling for network energy saving in an idle mode. A network entity can transmit a keep-alive signal (KAS) to reduce the energy consumption of a network when the network is in an idle mode. In some aspects, the KAS can be a reduced synchronization signal block (SSB) that is sent more frequently than a full SSB. In some aspects, the KAS can have a different beam sweeping pattern and/or beam width from the full SSB.

One aspect of the disclosure provides a network entity for a wireless communication network. The network entity includes a memory and a processor communicatively coupled to the memory. The processor and the memory are configured to: transmit a synchronization signal block (SSB) comprising a plurality of signals including at least one synchronization signal and a control channel; and transmit a keep-alive signal (KAS) comprising a subset of the plurality of signals included in the SSB.

One aspect of the disclosure provides a method for wireless communication at a network entity. The method includes transmitting a synchronization signal block (SSB) comprising a plurality of signals including at least one synchronization signal and a control channel. The method further includes transmitting a keep-alive signal (KAS) comprising a subset of the plurality of signals included in the SSB.

One aspect of the disclosure provides a network entity for a wireless communication network. The network entity includes means for transmitting a synchronization signal block (SSB) comprising a plurality of signals including at least one synchronization signal and a control channel. The network entity further includes means for transmitting a keep-alive signal (KAS) comprising a subset of the plurality of signals included in the SSB.

One aspect of the disclosure provides a computer-readable storage medium stored with executable code for causing a network entity to transmit a synchronization signal block (SSB) comprising a plurality of signals including at least one synchronization signal and a control channel. The executable code further causes the network entity to transmit a keep-alive signal (KAS) comprising a subset of the plurality of signals included in the SSB.

One aspect of the disclosure provides a network entity for a wireless communication network. The network entity includes a memory and a processor communicatively coupled to the memory. The processor and the memory are configured to transmit a first synchronization signal block (SSB) burst using a first beam sweeping pattern, the first SSB configured to indicate a presence of a cell associated with the network entity in an energy saving mode. The processor and the memory are further configured to transmit a second SSB burst using a second beam sweeping pattern that is different from the first beam sweeping pattern in terms of at least one of a number of beams, a beam width, or a periodicity.

One aspect of the disclosure provides a method for wireless communication at a network entity. The method includes transmitting a first synchronization signal block (SSB) burst using a first beam sweeping pattern, the first SSB configured to indicate a presence of a cell associated with the network entity in an energy saving mode. The method further includes transmitting a second SSB burst using a second beam sweeping pattern that is different from the first beam sweeping pattern in terms of at least one of a number of beams, a beam width, or a periodicity.

One aspect of the disclosure provides a network entity for a wireless communication network. The network entity includes means for transmitting a first synchronization signal block (SSB) burst using a first beam sweeping pattern, the first SSB configured to indicate a presence of a cell associated with the network entity in an energy saving mode. The network entity further includes means for transmitting a second SSB burst using a second beam sweeping pattern that is different from the first beam sweeping pattern in terms of at least one of a number of beams, a beam width, or a periodicity.

One aspect of the disclosure provides a computer-readable storage medium stored with executable code for causing a network entity to transmit a first synchronization signal block (SSB) burst using a first beam sweeping pattern, the first SSB configured to indicate a presence of a cell associated with the network entity in an energy saving mode. The executable code further causes the network entity to transmit a second SSB burst using a second beam sweeping pattern that is different from the first beam sweeping pattern in terms of at least one of a number of beams, a beam width, or a periodicity.

One aspect of the disclosure provides a user equipment (UE) for wireless communication. The UE includes a memory, a transceiver for wireless communication, and a processor communicatively coupled to the memory and the transceiver. The processor and the memory are configured to receive, from a network entity, a synchronization signal block (SSB) comprising a plurality of signals including at least one synchronization signal and a control channel. The processor and the memory are configured to receive, from the network entity, a keep-alive signal (KAS) comprising a subset of the plurality of signals included in the SSB.

One aspect of the disclosure provides a method for wireless communication at a user equipment (UE). The method includes receiving, from a network entity, a synchronization signal block (SSB) comprising a plurality of signals including at least one synchronization signal and a control channel. The method further includes receiving, from the network entity, a keep-alive signal (KAS) comprising a subset of the plurality of signals included in the SSB.

One aspect of the disclosure provides a user equipment (UE) for wireless communication. The UE includes means for receiving, from a network entity, a synchronization signal block (SSB) comprising a plurality of signals including at least one synchronization signal and a control channel. The UE further includes means for receiving, from the network entity, a keep-alive signal (KAS) comprising a subset of the plurality of signals included in the SSB.

One aspect of the disclosure provides a computer-readable storage medium stored with executable code for causing a user equipment (UE) to receive, from a network entity, a synchronization signal block (SSB) comprising a plurality of signals including at least one synchronization signal and a control channel. The executable code further causes the UE to receive, from the network entity, a keep-alive signal (KAS) comprising a subset of the plurality of signals included in the SSB.

One aspect of the disclosure provides a user equipment (UE) for wireless communication. The UE includes a memory, a transceiver for wireless communication, and a processor communicatively coupled to the memory and the transceiver. The processor and the memory are configured to receive, from a network entity, a first synchronization signal block (SSB) burst with a first beam sweeping pattern, the first SSB burst configured to indicate a presence of a cell associated with the network entity in an energy saving mode. The processor and the memory are further configured to receive, from the network entity, a second SSB burst with a second beam sweeping pattern that is different from the first beam sweeping pattern in terms of at least one of a number of beams, a beam width, or a periodicity.

One aspect of the disclosure provides a method for wireless communication at a user equipment (UE). The method includes receiving, from a network entity, a first synchronization signal block (SSB) burst with a first beam sweeping pattern, the first SSB burst configured to indicate a presence of a cell associated with the network entity in an energy saving mode. The method further includes receiving, from the network entity, a second SSB burst with a second beam sweeping pattern that is different from the first beam sweeping pattern in terms of at least one of a number of beams, a beam width, or a periodicity.

One aspect of the disclosure provides a user equipment (UE) for wireless communication. The UE includes means for receiving, from a network entity, a first synchronization signal block (SSB) burst with a first beam sweeping pattern, the first SSB burst configured to indicate a presence of a cell associated with the network entity in an energy saving mode. The UE further includes means for receiving, from the network entity, a second SSB burst with a second beam sweeping pattern that is different from the first beam sweeping pattern in terms of at least one of a number of beams, a beam width, or a periodicity.

One aspect of the disclosure provides a computer-readable storage medium stored with executable code for causing a user equipment (UE) to receive, from a network entity, a first synchronization signal block (SSB) burst with a first beam sweeping pattern, the first SSB burst configured to indicate a presence of a cell associated with the network entity in an energy saving mode. The executable code further causes the UE to receive, from the network entity, a second SSB burst with a second beam sweeping pattern that is different from the first beam sweeping pattern in terms of at least one of a number of beams, a beam width, or a periodicity.

One aspect of the disclosure provides a network entity for a wireless communication network. The network entity includes a memory and a processor coupled to the memory. The processor is configured to send a keep-alive signal (KAS) periodically. The processor is further configured to send a periodic synchronization signal after sending a plurality of KASs and skipping the KAS in a period for sending the periodic synchronization signal, the KAS consuming less communication resources than the periodic synchronization signal.

One aspect of the disclosure provides a method for wireless communication at a network entity. The method includes sending a keep-alive signal (KAS) periodically. The method further includes sending a periodic synchronization signal after sending a plurality of KASs and skipping the KAS in a period for sending the periodic synchronization signal, the KAS consuming less communication resources than the periodic synchronization signal.

One aspect of the disclosure provides a user equipment (UE) for wireless communication. The UE includes a memory, a transceiver for wireless communication, and a processor coupled to the memory and the transceiver. The processor is configured to receive a keep-alive signal (KAS) periodically. The processor is further configured to receive a periodic synchronization signal after receiving a plurality of KASs and skipping the KAS in a period for receiving the periodic synchronization signal, the KAS consuming less communication resources than the periodic synchronization signal.

One aspect of the disclosure provides a method for wireless communication at a user equipment (UE). The method includes receiving a keep-alive signal (KAS) periodically. The method further includes receiving a periodic synchronization signal after receiving a plurality of KASs and skipping the KAS in a period for receiving the periodic synchronization signal, the KAS consuming less communication resources than the periodic synchronization signal.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

BRIEF DESCRIPTION OF THE DRAWINGS

FIG. 18 is a flow chart illustrating an exemplary process for transmitting SSB bursts according to some aspects.

FIG. 22 is a flow chart illustrating an exemplary process for receiving SSB bursts according to some aspects.

DETAILED DESCRIPTION

Figure 1:
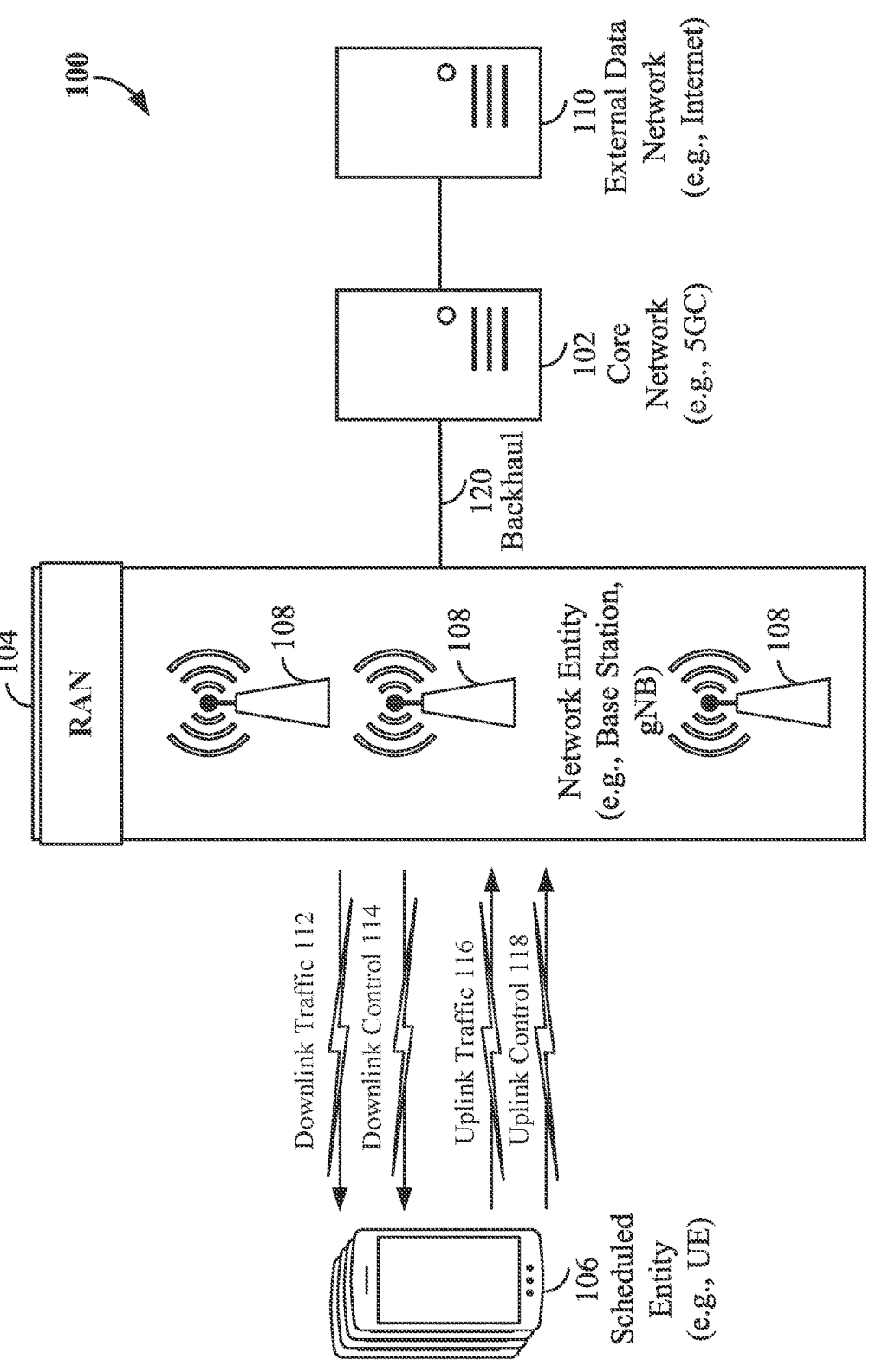
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

Aspects of the disclosure provide techniques and apparatuses for using keep-alive signaling to improve network energy saving in an idle mode. A network entity can transmit a keep-alive signal (KAS) to reduce the energy consumption of a network when the network (e.g., cell) is in an idle mode. In some aspects, the KAS can be a reduced synchronization signal block (SSB) that is sent more frequently than a full SSB. In some aspects, the KAS can have a different beam sweeping pattern and/or beam width from the full SSB. In some aspects, the KAS can use a combination of a reduced SSB and a different beam sweeping pattern from a full SSB.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. In some aspects, the RAN 104 may be an open radio access network (O-RAN) or a virtualized radio access network (vRAN, also known as a cloud radio access network (C-RAN)). As one example, the RAN 104 may operate according to $3^{rd}$ Generation Partnership Project (3GPP) New Radio (NR) specifications, often referred to as 5-G. As another example, the RAN 104 may operate under a hybrid of 5-G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities (e.g., base stations 108). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a network entity (described further below; e.g., base station 108 or scheduling entity). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity or a network entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a network entity 108 may broadcast downlink traffic 112 to one or more scheduled entities 106. Broadly, the network entity 108 can be a node or device responsible for scheduling traffic in a wireless communication network, including the downlink traffic 112 and, in some examples, uplink traffic 116 from one or more scheduled entities 106 to the network entity 108. On the other hand, the scheduled entity 106 is a node or device that receives downlink control information 114, including but not limited to scheduling information (e.g., a grant), synchronization or timing information, or other control information from another entity in the wireless communication network such as the network entity 108. The scheduled entity 106 may further transmit uplink control information 118, including but not limited to a scheduling request or feedback information, or other control information to the network entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, network entities (e.g., base stations 108) may include a backhaul interface for communication with a backhaul portion 120 of the wireless communication system. The backhaul portion 120 may provide a link between a network entity (e.g., base station 108) and the core network 102. Further, in some examples, a backhaul network may provide interconnection between the respective network entities (e.g., base stations 108). Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4-G evolved packet core (EPC), or any other suitable standard or configuration.

Figure 2:
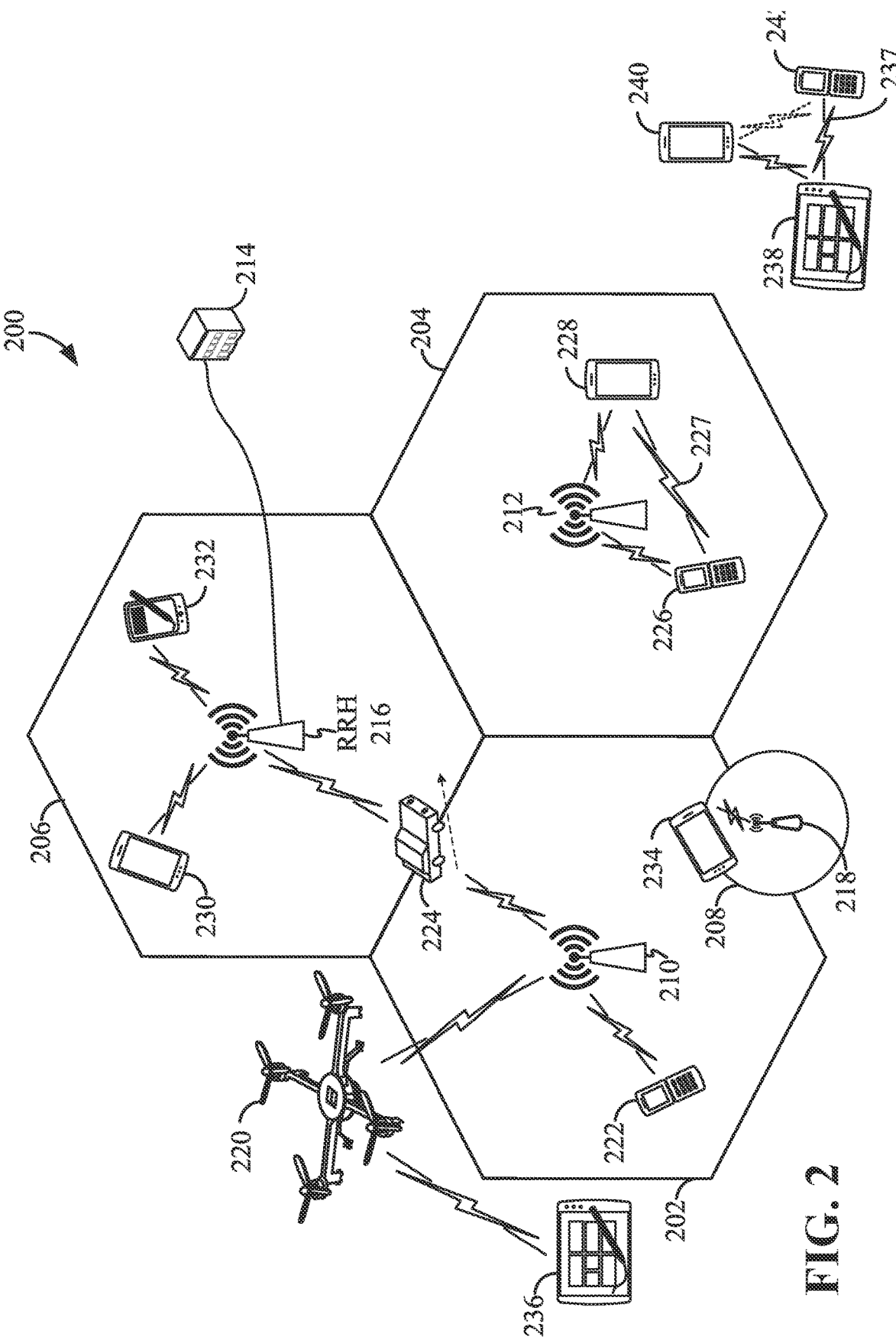
FIG. 2 is an illustration of an example of a radio access network (RAN) according to some aspects.

FIG. 2 is an illustration of an example of a RAN 200 according to some aspects. In some examples, the RAN 200 may be the same as the RAN 104 described above and illustrated in FIG. 1. In some aspects, the RAN 200 may be an O-RAN, vRAN, or C-RAN. The geographic area covered by the RAN 200 may be divided into cellular regions (cells) that can be uniquely identified by a user equipment (UE) based on an identification broadcasted from one access point or network entity. A network entity may be implemented in an aggregated or monolithic base station architecture (e.g., gNB), or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

FIG. 2 illustrates cells 202, 204, 206, and 208, each of which may include one or more sectors (not shown). A sector is a sub-area of a cell. All sectors within one cell are served by the same network entity (e.g., a base station). A radio link within a sector can be identified by a single logical identification belonging to that sector. In a cell that is divided into sectors, the multiple sectors within a cell can be formed by groups of antennas with each antenna responsible for communication with UEs in a portion of the cell.

Various network entity arrangements can be utilized. For example, in FIG. 2, two network entities (e.g., base station 210 and base station 212) are shown in cells 202 and 204. A third network entity (e.g., base station 214) is shown controlling a remote radio head (RRH) 216 in cell 206. That is, a network entity (e.g., a base station) can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a network entity (e.g., base station 218) is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless network entities (e.g., base stations) and cells. Further, a relay node may be deployed to extend the size or coverage area of a given cell. The network entities (e.g., base stations 210, 212, 214, 218) can provide wireless access points to a core network for any number of mobile apparatuses. In some examples, the base stations 210, 212, 214, and/or 218 may be the same as the base station/ scheduling entity 108 described above and illustrated in FIG. 1.

FIG. 2 further includes an unmanned aerial vehicle (UAV) 220, which may be a quadcopter or drone. The UAV 220 may be configured to function as a network entity (e.g., base station). That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each network entity (e.g., base stations 210, 212, 214, 218, and 220) may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a network entity (e.g., base station). Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a network entity (e.g., base station). In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a network entity (e.g., base station). In other examples, two or more UEs (e.g., UEs 226 and 228) within the coverage area of a network entity (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from a network entity (e.g., the base station 212) via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the network entities (e.g., base stations 210, 212, and 214/216) may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the network entities (e.g., base stations 210, 212, and 214/216) may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex.

Further, the air interface in the RAN 200 may utilize one or more multiplexing and multiple access algorithms to enable simultaneous communication of the various devices. For example, 5G NR specifications provide multiple access for UL transmissions from UEs 222 and 224 to a network entity (e.g., base station 210), and for multiplexing for DL transmissions from a network entity (e.g., base station 210) to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Deployment of communication systems, such as 5-G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5-G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
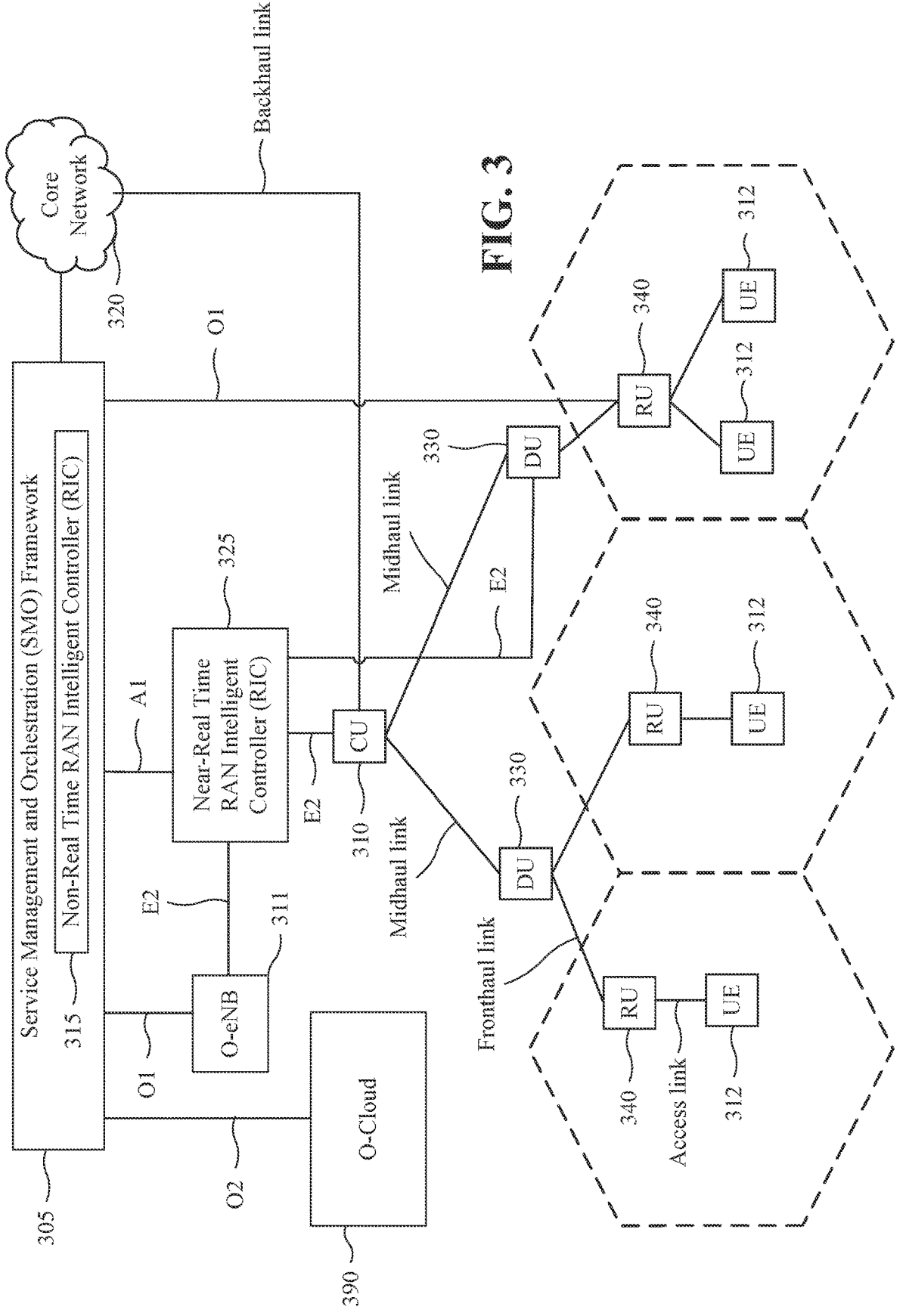
FIG. 3 is a diagram illustrating an example of disaggregated base station architecture according to some aspects.

FIG. 3 shows a diagram illustrating an example disaggregated base station architecture. In some aspects, the disaggregated base station architecture can be implemented in the wireless communication system 100 and RAN 200. The disaggregated base station architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 312 via one or more radio frequency (RF) access links. In some implementations, the UE 312 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 312. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4-G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
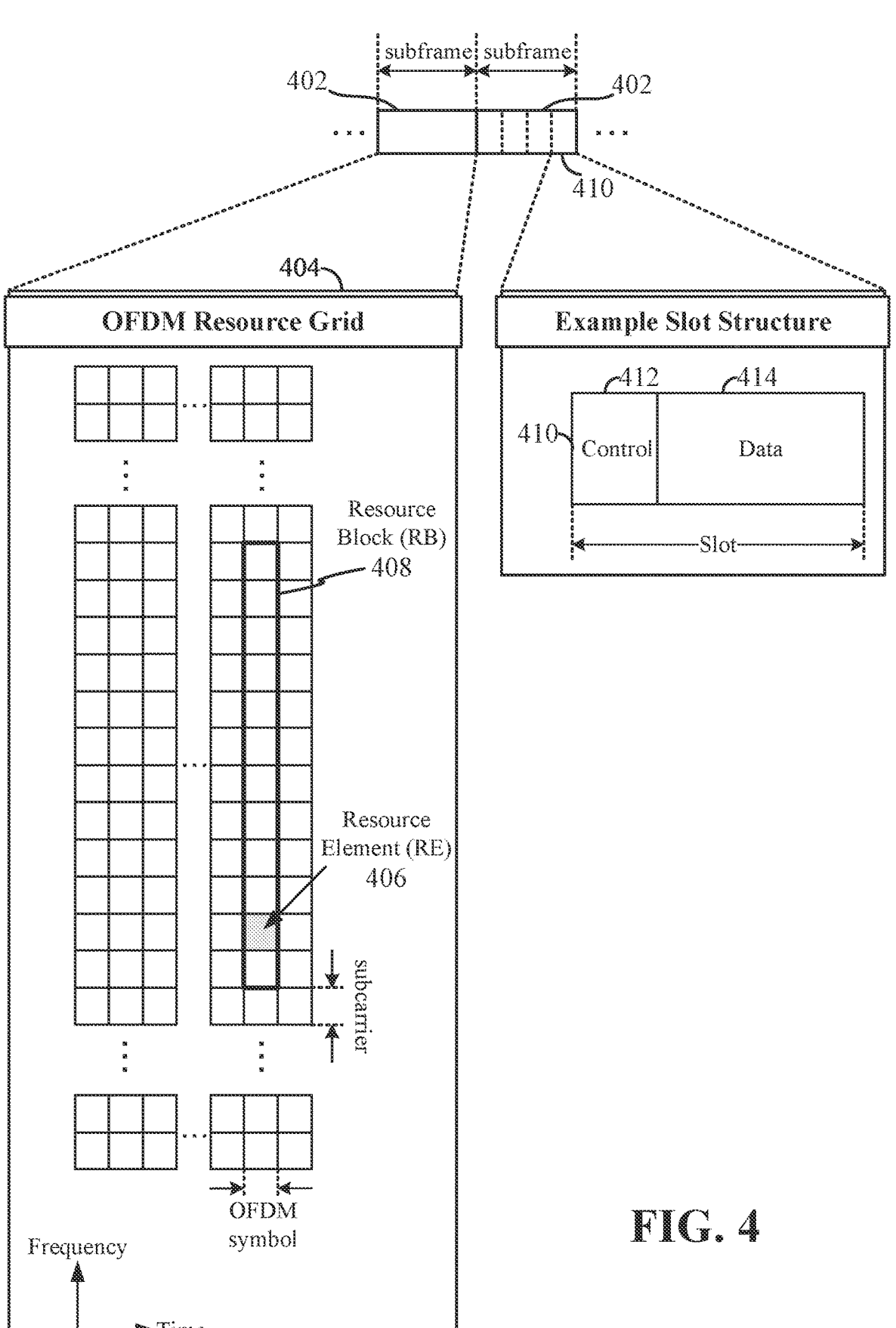
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity, such as a scheduling entity or a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a network entity, base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the network entity (e.g., a base station) may allocate one or more REs

406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) to carry other DL signals, such as a demodulation reference signal (DMRS); a phase-tracking reference signal (PT-$\mu$S); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the network entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the network entity to schedule uplink transmissions. Here, in response to the SR transmitted on the UCI, the network entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting (Tx)) sidelink device (e.g., Tx V2X device or other Tx UE) towards a set of one or more other receiving (Rx) sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
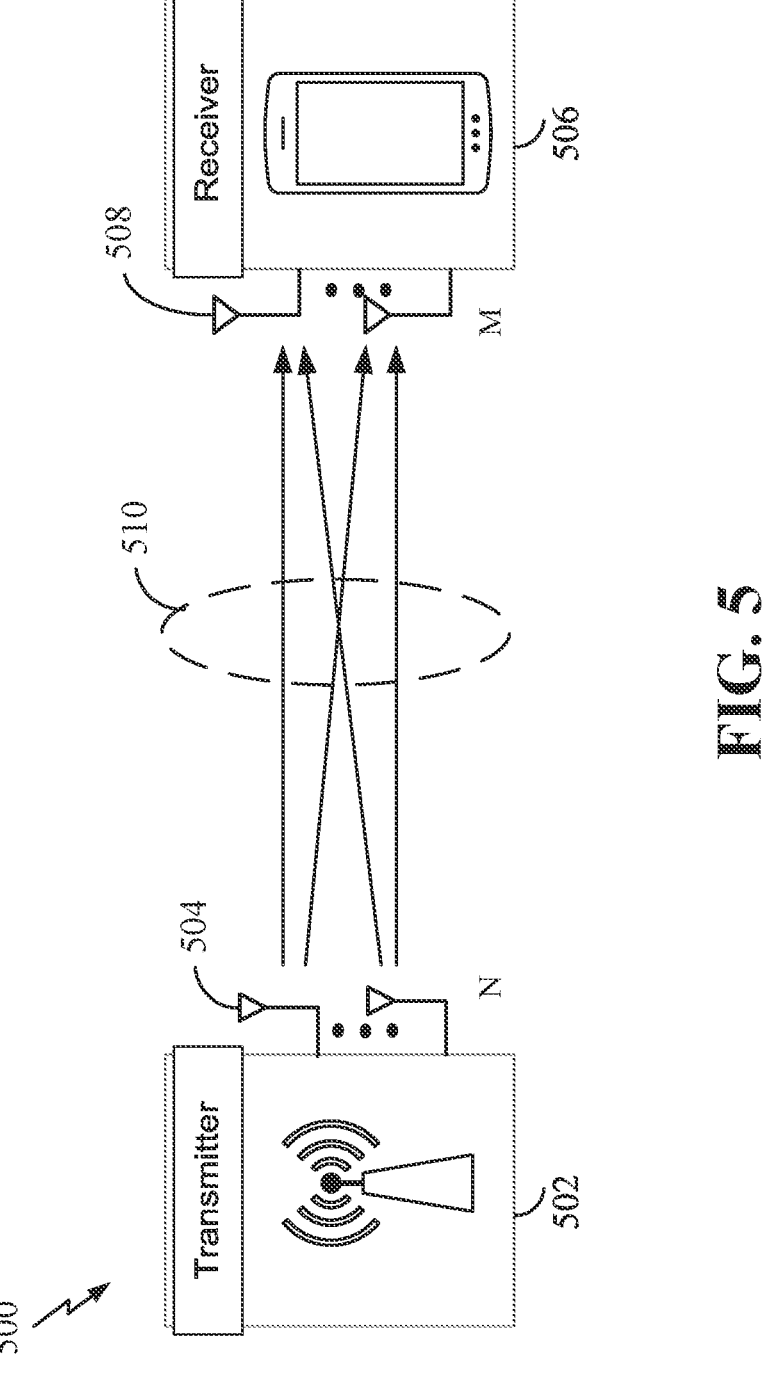
FIG. 5 is a block diagram illustrating a wireless communication system supporting multiple-input multiple-output (MIMO) communication.

In some aspects of the disclosure, the network entity (e.g., a base station) and/or scheduled entity (e.g., a UE) may be configured for beamforming and/or multiple-input multiple-output (MIMO) technology. FIG. 5 illustrates an example of a wireless communication system 500 supporting MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a network entity (e.g., scheduling entity 108), a scheduled entity 106, UE, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-µS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHZ) which is identified by the International Telecommunications Union (ITU) as a "millimeter wave" band.

The frequencies between FR1 and FR2 are often referred to as mid-band frequencies. Recent 5-G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5-G NR operation beyond 52.6 GHZ. For example, three higher operating bands have been identified as frequency range designations FR4-a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In 5-G NR systems, particularly for FR2 (millimeter wave) systems, beamformed signals may be utilized for most downlink channels, including the PDCCH and PDSCH. In addition, broadcast control information, such as the SSB, slot format indicator (SFI), and paging information, may be transmitted in a beam-sweeping manner to enable all scheduled entities (UEs) in the coverage area of a network entity (e.g., a TRP, gNB) to receive the broadcast control information. In addition, for UEs configured with beamforming antenna arrays, beamformed signals may also be utilized for uplink channels, including the PUCCH and PUSCH. In addition, beamformed signals may further be utilized in D2D systems, such as NR sidelink or V2X, utilizing FR2.

Figure 6:
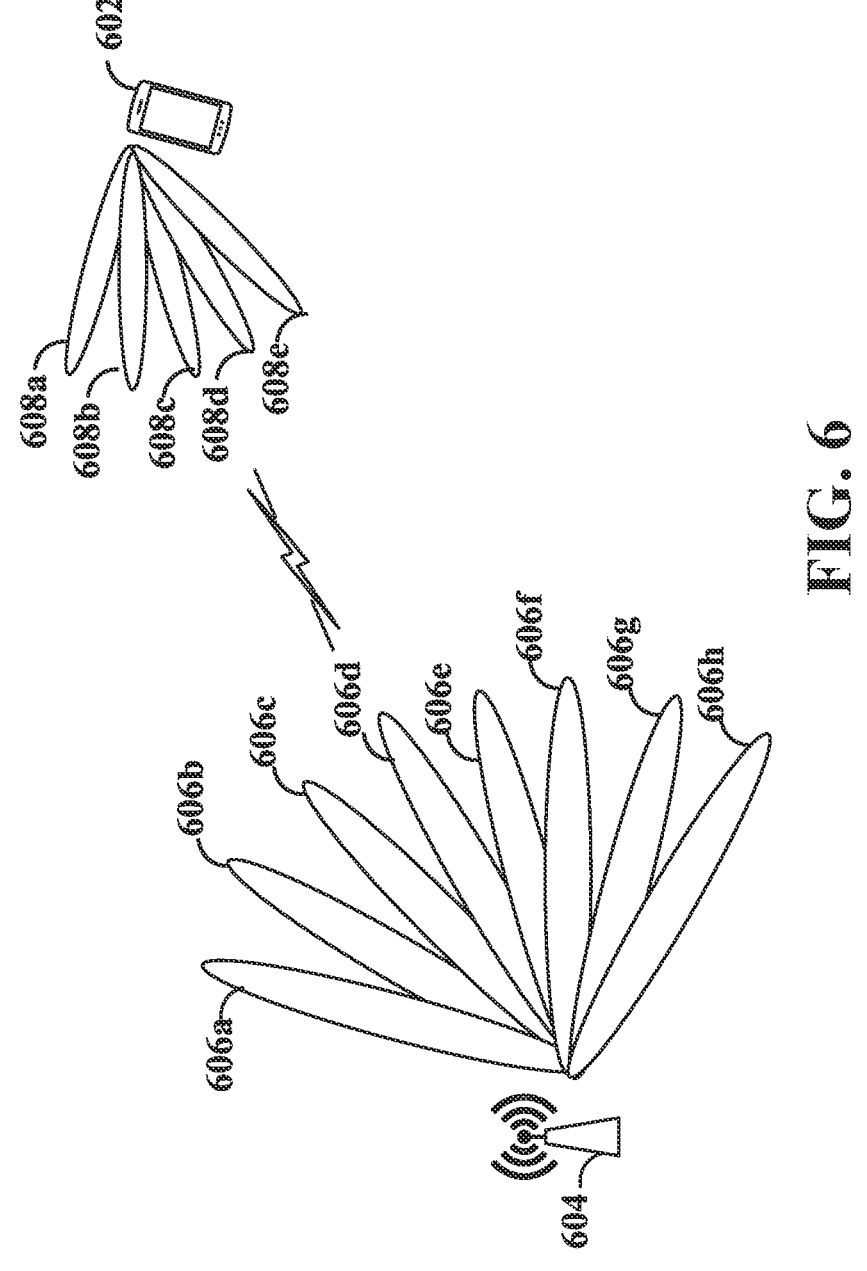
FIG. 6 is a diagram illustrating communication between a network entity and a user equipment (UE) using beamformed signals according to some aspects.

FIG. 6 is a diagram illustrating communication between a network entity 604 and a UE 602 using beamformed signals according to some aspects. The network entity 604 may be any of the scheduling entities or base stations (e.g., gNBs) illustrated in FIGS. 1 and/or 2, and the UE 602 may be any of the UEs or scheduled entities illustrated in FIGS. 1 and/or 2.

The network entity 604 may generally be capable of communicating with the UE 602 using one or more transmit beams, and the UE 602 may further be capable of communicating with the network entity 604 using one or more receive beams. As used herein, the term transmit beam refers to a beam on the network entity 604 that may be utilized for downlink or uplink communication with the UE 602. In addition, the term receive beam refers to a beam on the UE 602 that may be utilized for downlink or uplink communication with the network entity 604.

In the example shown in FIG. 6, the network entity 604 is configured to generate a plurality of transmit beams 606a-606h, each associated with a different spatial direction. In addition, the UE 602 is configured to generate a plurality of receive beams 608a-608e, each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the network entity 604 and UE 602 may each transmit more or less beams distributed in all directions (e.g., 360 degrees) and in three dimensions. In addition, the transmit beams 606a-606h may include beams of varying beam width. For example, the network entity 604 may transmit certain signals (e.g., SSBs) on wider beams and other signals (e.g., CSI-RSs) on narrower beams.

The network entity 604 and UE 602 may select one or more transmit beams 606a-606h on the network entity 604 and one or more receive beams 608a-608e on the UE 602 for communication of uplink and downlink signals therebetween using a beam management procedure. In one example, during initial cell acquisition, the UE 602 may perform a P1 beam management procedure to scan the plurality of transmit beams 606a-606h on the plurality of receive beams 608a-608e to select a beam pair link (e.g., one of the transmit beams 606a-606h and one of the receive beams 608a-608c) for a physical random access channel (PRACH) procedure for initial access to the cell. For example, periodic SSB beam sweeping may be implemented on the network entity 604 at certain intervals (e.g., based on the SSB periodicity). Thus, the network entity 604 may be configured to sweep or transmit an SSB on each of a plurality of wider transmit beams 606a-606h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 604 and UE 602 may perform a P2 beam management procedure for beam refinement at the network entity 604. For example, the network entity 604 may be configured to sweep or transmit a CSI-RS on each of a plurality of narrower transmit beams 606a-606h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/ deactivated via medium access control-control element (MAC-CE) signaling by the gNB), or aperiodically (e.g., as triggered by the gNB via downlink control information (DCI)). The UE 602 is configured to scan the plurality of CSI-RS transmit beams 606a-606h on the plurality of receive beams 608a-608c. The UE 602 then performs beam measurements (e.g., RSRP, SINR, etc.) of the received CSI-RSs on each of the receive beams 608a-608e to determine the respective beam quality of each of the CSI-RS transmit beams 606a-606h as measured on each of the receive beams 608a-608c.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h on one or more of the receive beams 608a-608e to the network entity 604. The network entity 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as config- ured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the network entity 604 may configure the UE 602 to perform SSB beam measurements and pro- vide an L1 measurement report containing beam measure- ments of SSB transmit beams 606a-606h. For example, the network entity 604 may configure the UE 602 to perform SSB beam measurements and/or CSI-RS beam measure- ments for beam failure detection (BRD), beam failure recov- ery (BFR), cell reselection, beam tracking (e.g., for a mobile UE 602 and/or network entity 604), or other beam optimi- zation purpose.

In addition, when the channel is reciprocal, the transmit and receive beams may be selected using an uplink beam management scheme. In an example, the UE 602 may be configured to sweep or transmit on each of a plurality of receive beams 608a-608c. For example, the UE 602 may transmit an SRS on each beam in the different beam direc- tions. In addition, the network entity 604 may be configured to receive the uplink beam reference signals on a plurality of transmit beams 606a-606h. The network entity 604 then performs beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The network entity 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606d) on the network entity 604 and a single receive beam (e.g., beam 608c) on the UE may form a single BPL used for communication between the network entity 604 and the UE 602. In another example, multiple CSI-RS transmit beams (e.g., beams 606c, 606d, and 606c) on the network entity 604 and a single receive beam (e.g., beam 608c) on the UE 602 may form respective BPLs used for communication between the network entity 604 and the UE 602. In another example, multiple CSI-RS transmit beams (e.g., beams 606c, 606d, and 606c) on the network entity 604 and multiple receive beams (e.g., beams 608c and 608d) on the UE 602 may form multiple BPLs used for communication between the network entity 604 and the UE 602. In this example, a first BPL may include transmit beam 606c and receive beam 608c, a second BPL may include transmit beam 608d and receive beam 608c, and a third BPL may include transmit beam 608c and receive beam 608d.

In addition to L1 measurement reports, the UE 602 can further utilize the beam reference signals to estimate the channel quality of the channel between the network entity 604 and the UE 602. For example, the UE 602 may measure the SINR of each received CSI-RS and generate a CSI report based on the measured SINR. The CSI report may include, for example, a channel quality indicator (CQI), rank indi- cator (RI), precoding matrix indicator (PMI), and/or layer indicator (L1). The network entity (e.g., gNB) may use the CSI report to select a rank for the UE, along with a precoding matrix and a MCS to use for future downlink transmissions to the UE. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The L1 may be utilized to indicate which column of the precoding matrix of the reported PMI corresponds to the strongest layer code word corresponding to the largest reported wideband CQI.

To distinguish between the different types of reports (including CSI reports and L1 measurement reports) and different types of measurements, the network entity 604 may configure the UE 602 with one or more report settings. Each report setting may be associated with a reference signal configuration indicating a configuration of one or more reference signals (e.g., CSI-RSs) for use in generating the CSI report. In some examples, a report setting may be associated with a combined reference signal configuration.

Figure 7:
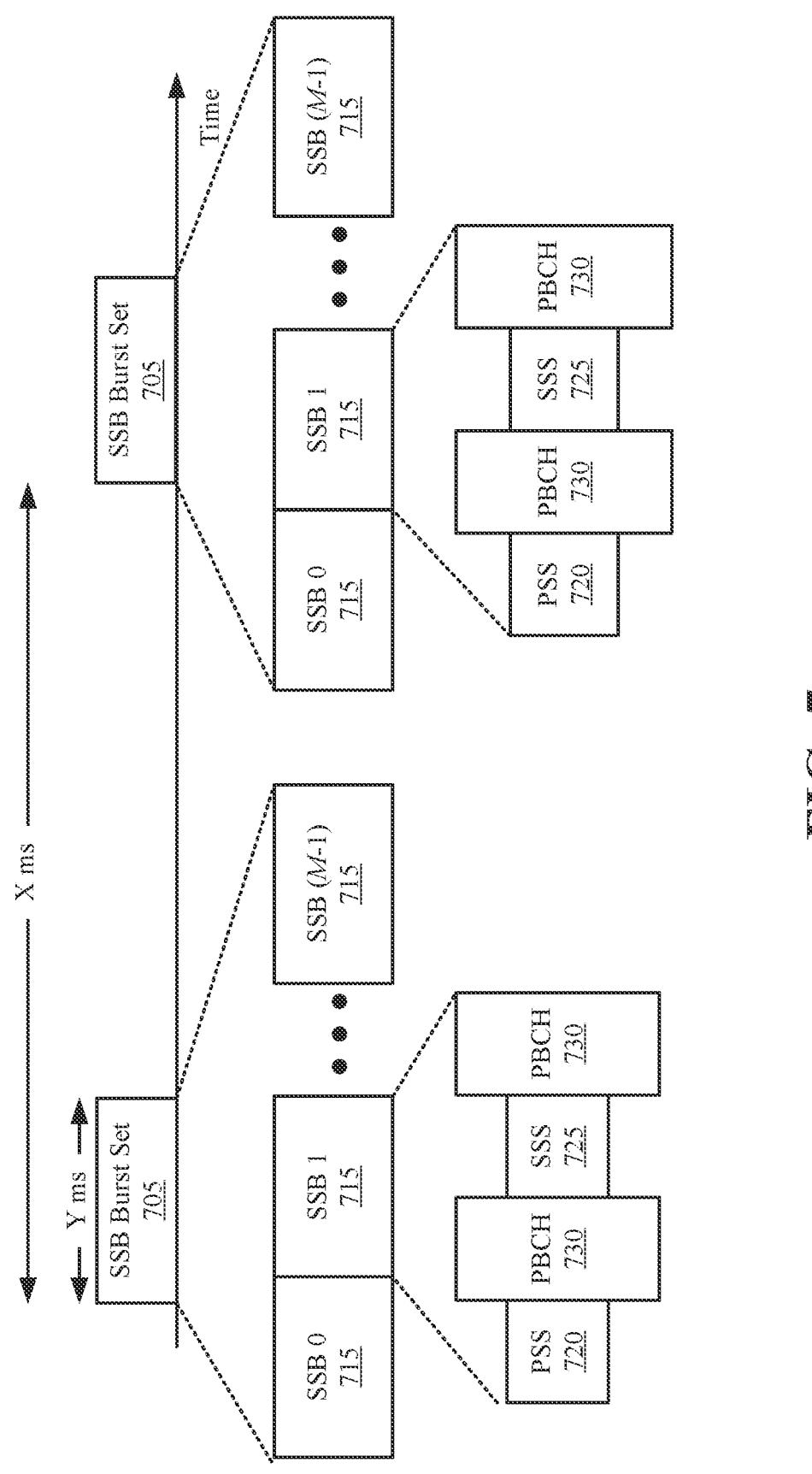
FIG. 7 is a diagram illustrating an example of a synchronization signal (SS) hierarchy according to some aspects.

FIG. 7 is a diagram illustrating an example of a synchronization signal (SS) hierarchy according to some aspects. As shown in FIG. 7, the SS hierarchy may include an SSB burst set 705. As further shown, each SSB burst set 705 may include one or more SSBs 715, shown as SSB 0 through SSB M−1, where M is a maximum number of SSBs 715 that can be carried by an SSB burst set 705. In some aspects, different SSBs 715 may be beam-formed differently (e.g., SSBs transmitted using different beams), and the SSBs may be used for cell search, cell acquisition, beam management, and/or beam selection (e.g., as part of an initial network access procedure). An SSB burst set 705 may be periodically transmitted by a wireless node (e.g., a network entity 108), such as every X milliseconds (ms), as shown in FIG. 7. In one example, the SSB burst set 705 may have a periodicity of 20 ms for initial cell search. In some examples, an SSB burst set 705 may have a fixed or dynamic duration, shown as Y milliseconds in FIG. 7. In one example, the duration Y ms of an SSB burst set 705 can be confined within a window of 5 ms according to the 3GPP specification. In some cases, an SS burst set 705 may be referred to as a discovery reference signal (DRS) transmission window or an SSB measurement time configuration (SMTC) window. The DRS is a type of reference signal used for device discovery and initial access. The DRS transmission window is a specific time interval during which the DRS is transmitted by the network. The DRS can be transmitted during a specific time duration within the SSB burst and is used by the UE to detect the presence of the base station and to estimate its physical layer characteristics. During the SMTC window, the UE can measure the signal strength, signal quality, and other parameters of the SSB transmitted by the neighboring cells.

In some examples, an SSB (e.g., SSB 715) may include resources that carry a PSS 720, an SSS 725, and/or a physical broadcast channel (PBCH) 730. In some examples, multiple SSBs 715 are included in an SSB burst set 705 (e.g., with transmission on different beams), and the PSS 720, the SSS 725, and/or the PBCH 730 may be the same across each SSB 715 of the SSB burst set 705. In some examples, a single SSB 715 may be included in an SSB burst set 705. In some examples, the SSB 715 may be at least four symbols (e.g., OFDM symbols) in length/time, where each symbol carries one or more of the PSS 720 (e.g., occupying one symbol), the SSS 725 (e.g., occupying one symbol), and/or the PBCH 730 (e.g., occupying two or more symbols). In some examples, a first symbol of the SSB 715 may carry the PSS 720, a second symbol of the SSB 715 may carry the PBCH 730, a third symbol of the SSB 715 may carry the SSS 725 and the PBCH 730, and a fourth signal of the SSB 715 may carry the PBCH 730. The PSS 720 and SSS 725 may carry a physical cell identifier (PCI). For example, in 5G/NR there may be 1008 possible PCI values. In some examples, the PSS 720 may carry a sequence (e.g., an m-sequence of length 127) selected from three different sequences corresponding to three different groups of 336 PCI values. In some examples, the SSS 725 may carry a sequence selected from 336 different sequences corresponding to different PCI values. The PBCH may carry a MIB that provides system information for initial access (e.g., how to receive RMSI, as well as timing information including an SSB index). In some aspects, an SSB 715 may be referred to as an SS/PBCH block.

In some aspects, the symbols of an SSB 715 can be consecutive, as shown in FIG. 4. In some aspects, the symbols of an SSB 715 can be non-consecutive. Similarly, in some aspects, one or more SSBs 715 of the SSB burst set 705 may be transmitted in consecutive radio resources (e.g., consecutive symbols) during one or more slots. Additionally, or alternatively, one or more SSBs 715 of the SSB burst set 705 may be transmitted in non-consecutive radio resources.

In some aspects, the SSB burst sets 705 may have a burst period (e.g., Y ms), and the SSBs 715 of the SSB burst set 705 may be transmitted by a wireless node (e.g., network entity 108) according to the burst period. In some examples, an SSB burst set 705 may include multiple repetitions of SSB bursts within its periodicity.

In some aspects, an SSB 715 may include an SSB index, which may correspond to a beam used to carry the SSB 715. A UE (e.g., UE 602) may monitor for and/or measure SSBs 715 using different receive (Rx) beams during an initial network access procedure and/or a cell search procedure, among other examples. Based at least in part on the monitoring and/or measuring, the UE may indicate one or more SSBs 715 with a better/best signal parameter (e.g., an RSRP parameter) to a network entity (e.g., a base station or gNB). The network entity and the UE may use the one or more indicated SSBs 715 to select one or more beams to be used for communication between the network entity and the UE (e.g., for a random access channel (RACH) procedure). Additionally, or alternatively, the UE may use the SSB 715 and/or the SSB index to determine a cell timing for a cell via which the SSB 715 is received (e.g., a serving cell).

As indicated above, FIG. 7 is provided as an example of SSB bursts. Other examples may differ from what is described with regard to FIG. 7.

It is desirable to conserve energy in a wireless network, for example by reducing the power consumption of network nodes or entities (e.g., base stations and/or cells). In some cases, a cell or network entity that is not serving any UEs may enter an energy saving mode. In some examples, while a cell is in an energy saving mode, a network entity (e.g., base station, TRP, gNB, CU. DU) associated with that cell may transmit SSBs and monitor a RACH only for cell discovery purposes. This may result in unnecessary network energy consumption due to transmitting the SSBs with a shorter periodicity than needed while in the energy saving mode. In some examples, a cell (e.g., base station, TRP, gNB, CU, DU) in an energy saving mode may be turned off such that the network entity associated with that cell does not transmit SSBs for the cell. In this case, the network entity (e.g., base station, TRP, CU, DU, or gNB) associated with the cell in the energy saving mode may need wake-up signaling from a central network entity to resume transmitted SSBs for the cell. This may result in reduced network energy consumption as compared with transmitting SSBs and monitoring the RACH for cell discovery purposes, but may result in increased connection latency when a UE discovers and attempts to connect to the cell.

Various techniques and apparatuses described herein may enable a network entity to transmit a keep-alive signal (KAS) that indicates a presence of a cell in an energy saving mode. In some aspects, the network entity can transmit a KAS using less energy compared to a full or nominal SSB that includes the PSS, SSS, and PBCH. In one example, the KAS may be a reduced or modified SSB that uses less energy than a full SSB. In some aspects, the network entity can transmit a reduced SSB burst as the KAS that uses less energy than transmitting a full SSB burst. In some aspects, the UE may transmit an uplink triggering signal to the network entity based at least in part on receiving the KAS (e.g., reduced SSB). In response to the triggering signal, the network entity transmits a full or nominal SSB burst. As a result, the network entity may reduce the frequency of transmitting a full SSB, resulting in reduced power consumption. Further, the connection latency may be reduced as compared with turning off the cell and requiring wake-up signaling from a central network entity. Accordingly, the techniques and apparatuses described herein may result in an improved tradeoff between network energy savings and connection latency for a cell (e.g., RAN 200) in an energy saving mode.

Figure 8:
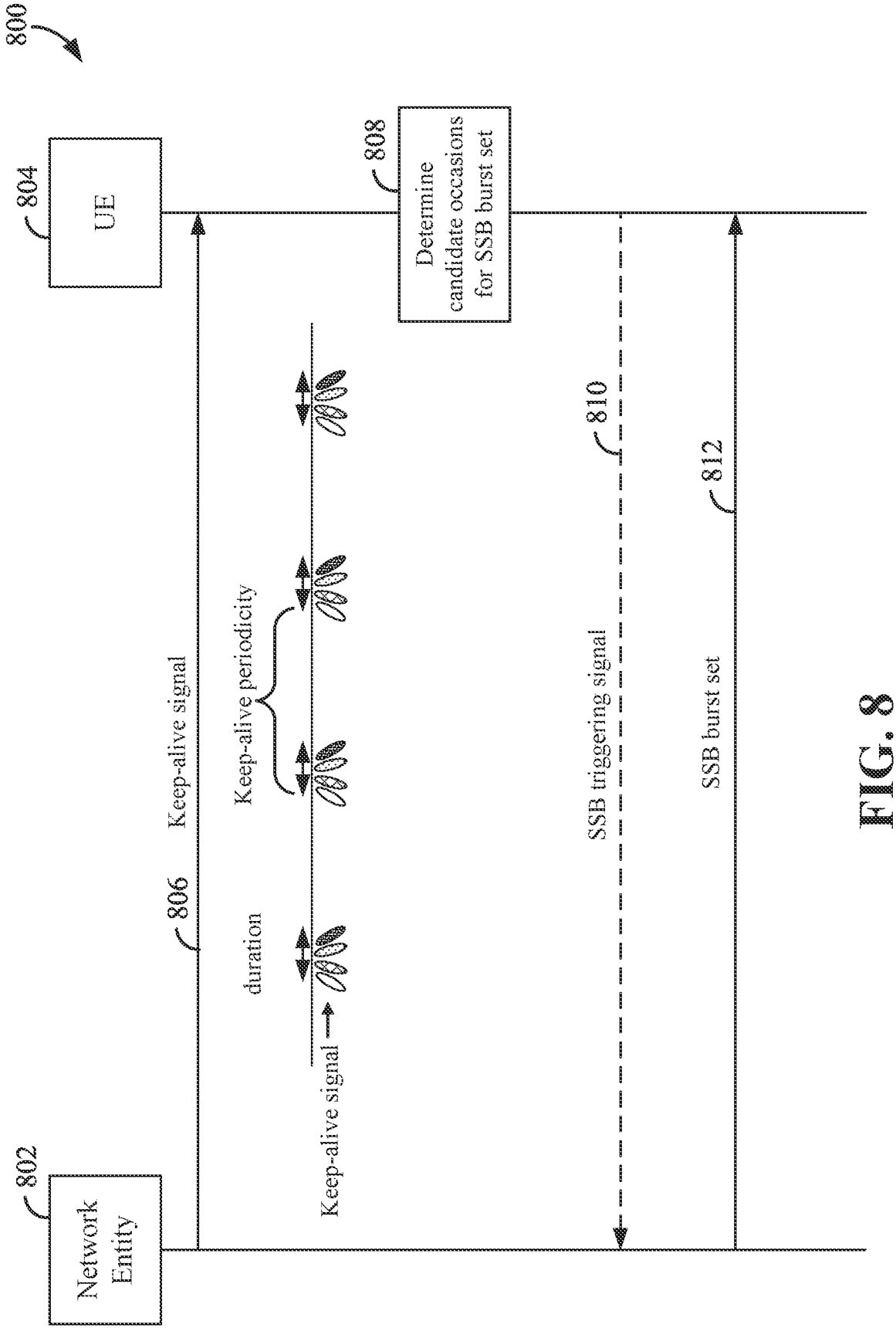
FIG. 8 is a diagram illustrating an example of keep-alive signaling for network energy saving according to some aspects.

FIG. 8 is a diagram illustrating an example 800 of keep-alive signaling for network energy saving according to some aspects. As shown in FIG. 8, the example includes communication or signaling between a network entity 802 and a UE 804. In some examples, the network entity 802 may be any of the network entities (e.g., a gNB, base station, CU, DU, TRP) discussed herein, and the UE 804 may be any of the scheduled entities or UEs described herein. In some aspects, the network entity 802 and the UE 804 may be included in a wireless network, such as the RAN 100/200 (FIGS. 1 and 2). The network entity 802 and the UE 804 may communicate with each other via a wireless access link, which may include an uplink and a downlink.

As shown in FIG. 8, the network entity 802 may transmit a keep-alive signal (KAS) 806 that indicates the presence of a cell in an energy saving mode. In the energy saving mode, the cell can reduce its power consumption by turning off or reducing the power of some of its transmission resources. This helps to reduce the energy consumption of the cell. For example, when a cell enters the energy saving mode, it can stop transmitting some of its signals, such as the full SSB. In one aspect, the network entity 802 may periodically broadcast the keep-alive signal while a cell associated with the network entity 802 is in the energy saving mode. In some aspects, the network entity 802 can begin transmitting the keep-alive signal 806 based at least in part on switching the cell associated with the network entity 802 to the energy saving mode. In some aspects, the network entity 802 may switch the cell to the energy saving mode in connection with a determination that a number of UEs being served by the cell does not satisfy a threshold. For example, in some aspects, the network entity 802 may switch the cell to the energy saving mode in connection with a determination that no UEs are being served by the cell. A cell in the energy saving mode (also referred to as idle mode) may be referred to as an energy saving cell.

In some aspects, the keep-alive signal 806 may be a periodic signal that indicates the presence of the cell in the energy saving mode. In some aspects, the keep-alive signal may be based on one or more generation sequences that are configured to indicate the presence of a cell in the energy saving mode. In some aspects, the network entity may select the generation sequence(s) for the keep-alive signal from a set of candidate generation sequences that are configured to indicate the presence of a cell in the energy saving mode. A generation sequence is a sequence (e.g., m-sequence, Zad-off-Chu sequence, or gold sequence) used to generate a signal, such as the keep-alive signal.

In some aspects, the keep-alive signal 806 can be characterized by a periodicity (e.g., keep-alive periodicity), duration, and the one or more generation sequences used to generate the keep-alive signal. In some aspects, the periodicity and/or duration may be predefined for the keep-alive signal (e.g., pursuant to a wireless communication standard), and stored by the network entity 802 and the UE 804. In some aspects, the periodicity and/or duration for the keep-alive signal may be configured by another cell or network entity that is not in the energy saving mode. The periodicity associated with the keep-alive signal may be a time interval between periodic transmissions of the keep-alive signal by the network entity 802. The duration of the keep-alive signal may span one or more consecutive symbols. In some aspects, the duration of the keep-alive signal may span multiple consecutive symbols, and the network entity 802 may perform beam sweeping by transmitting the keep-alive signal over different beam directions in different symbols of the multiple consecutive symbols. For example, the network entity 802 may transmit the keep-alive signal on a first beam in a first symbol, on a second beam in a second symbol, and so on.

In some aspects, the duration of the keep-alive signal may span multiple consecutive symbols, and the keep-alive signal may be generated based on the same generation sequence for each of the multiple consecutive symbols. In this case, the UE may acquire and use only the symbol boundary for determining the timing (e.g., for monitoring for an SSB set and/or transmitting an uplink triggering signal, as described elsewhere herein). In some aspects, the duration of the keep-alive signal may span multiple consecutive symbols, and the keep-alive signal may be generated based on different generation sequences in different symbols of the multiple consecutive symbols. In this case, a mapping may be defined (e.g., in a wireless communication standard) between generation sequences and symbols within a slot. For example, the keep-alive signal may be generated based on a first generation sequence mapped to a first symbol, a second generation sequence mapped to a second symbol, and so on. In some aspects, the UE 804 may determine a symbol index based on the generating sequence received by the UE, and based at least in part on the symbol index, the UE 804 may acquire and utilize a slot boundary for timing (e.g., for monitoring for an SSB set and/or transmitting an uplink triggering signal, as described elsewhere herein).

In some aspects, the keep-alive signal may be associated with a cell group including one or more energy saving cells. In this case, different cell groups may be differentiated by keep-alive signals based on different generation sequences and/or different time offsets at which the keep-alive signals are scheduled. For example, at least one of the generation sequence or the time offset for the keep-alive signal transmitted by the network entity may be based at least in part on a cell group associated with one or more cells including the cell associated with the network entity 802.

In some aspects, the UE 804 may receive the keep-alive signal 806 transmitted by the network entity 802. For example, the UE 804 may detect and receive one or more periodic broadcasts of the keep-alive signal from the network entity 802. The UE 804 may determine that the cell associated with the network entity is in the energy saving mode based at least in part on receiving the keep-alive signal.

At 808, the UE can determine candidate occasions for receiving an SSB burst set based at least in part on receiving the keep-alive signal 806 from the network entity 802. A candidate occasion for receiving an SSB burst refers to a specific time interval during which an SSB is transmitted. For example, each SSB occasion corresponds to a unique combination of SSB index, beam index, and beam sweep, which together determine the specific time-frequency resources used for SSB transmission. In some aspects, the network entity 802 may periodically transmit an SSB burst set with a periodicity that is based at least in part on the periodicity of the keep-alive signal. For example, the periodicity (e.g., X ms of FIG. 7) of the SSB burst may be longer than the periodicity of the keep-alive signal. In this case, the UE, in connection with receiving the keep-alive signal from the network entity, may determine one or more candidate occasions for the SSB burst set and monitor the candidate occasions to attempt to receive the SSB burst set.

At 810, in some aspects, the UE may transmit an SSB triggering signal to the network entity 802 based at least in part on receiving the keep-alive signal. In some aspects, instead of (or in addition to) the network entity 802 periodically transmitting the SSB burst set for the cell in the energy saving mode, the network entity 802 may be triggered to transmit the SSB burst set by the SSB triggering signal transmitted by the UE in connection with the UE receiving the keep-alive signal. In some aspects, the UE may transmit the SSB triggering signal without determining candidate occasions for a periodically transmitted SSB burst set.

In some aspects, a predetermined sequence (e.g., generation sequence) may be defined (e.g., in a wireless communication standard) for the SSB triggering signal to trigger SSB burst set transmission. In some aspects, multiple sequences may be defined for transmitting the SSB triggering signal. In this case, the UE 804 may randomly select a sequence for transmitting the SSB triggering signal, from the multiple sequences defined for the SSB triggering signal. In one example, the SSB triggering signal may be simpler than a physical RACH (PRACH) preamble used for initiating a RACH initial access procedure. For example, the number of sequences defined for the SSB triggering signal may be fewer than a number of possible sequences (e.g., 64 sequences) defined for the PRACH preamble transmission. Because the SSB triggering signal is transmitted, by the UE, while the cell is in the energy saving mode, there may be no or few other UEs within the coverage of the cell at the time the UE 804 transmits the SSB triggering signal 810. Accordingly, the number of sequences defined for transmitting the SSB triggering signal may be less than the number of possible sequences for the PRACH preamble.

In some aspects, the network entity 802 may transmit the keep-alive signal 806 on multiple beams (e.g., a beam sweeping pattern). In one example, the network entity 802 may transmit the keep-alive signal on different beams (e.g., in different beam directions) on different symbols of the keep-alive signal duration. For example, the network entity 802 can transmit a first keep-alive signal using a first beam in a first symbol, and a second keep-alive signal using a second beam that is different from the first beam in a second symbol. In some aspects, a respective one or more resources for the SSB triggering signal may be associated with each beam of the multiple beams on which the keep-alive signal is transmitted. For example, the respective one or more resources associated with a beam may include one or more time resources for transmitting the SSB triggering signal, one or more frequency resources for transmitting the SSB triggering signal, and/or one or more code or sequence resources for transmitting the SSB triggering signal. In some aspects, the UE 804 may transmit the SSB triggering signal in a resource associated with the beam on which the UE 804 receives a keep-alive signal (e.g., a resource of the respective one or more resources associated with that beam). For example, the network entity may use different generation sequences for transmitting the keep-alive signal in different symbols (e.g., on different beams), and the UE 804 may determine a symbol index based on the generation sequence for the keep-alive signal received by the UE. In this case, the UE 804 may determine a resource (e.g., time resource, frequency resource, and/or code or sequence resource) for transmitting the SSB triggering signal based at least in part on the symbol index.

In some aspects, the UE 804 may transmit the SSB triggering signal in a time resource associated with the beam on which the keep-alive signal is received by the UE 804. For example, the UE 804 may apply a time offset (offsetToSSBTriggering) with respect to receiving the keep-alive signal, which may cause the UE 804 to transmit the SSB triggering signal at a time resource (e.g., a symbol or slot) that is associated with the beam on which the keep-alive signal is received by the UE 804. In some aspects, the UE 804 may transmit the SSB triggering signal in a frequency resource associated with the beam on which the keep-alive signal is received by the UE 804. For example, each symbol index may be mapped to one or more frequency resources, and the UE 804 may transmit the SSB triggering signal using a frequency resource associated with the symbol index determined based on the keep-alive signal. In some aspects, the UE 804 may transmit the SSB triggering signal using a code or sequence resource associated with the beam on which the keep-alive signal is received by the UE 804. "Code or sequence resource" refers to a code or sequence (e.g., generation sequence) that may be used to transmit the uplink triggering signal. For example, multiple possible sequences may be defined for the SSB triggering signal, with different sequences associated with different beams (e.g., associated with different symbol indexes). In this case, the UE 804 may select the generation sequence for transmitting the SSB triggering signal based at least in part on the beam on which the keep-alive signal is received (e.g., based at least in part on the symbol index determined for the keep-alive signal).

In some aspects, the network entity 802 may form a receive beam for receiving the SSB triggering signal based at least in part on the association between the different beams on which the keep-alive signal 806 is transmitted and the respective one or more resources on which the SSB triggering signal may be received by the network entity 802. For example, for each beam used to transmit the keep-alive signal, the network entity 802 may monitor the one or more resources associated with that beam (e.g., within an SSB triggering signal monitoring occasion) using a receive beam corresponding to that beam (e.g., a receive beam having the same beam direction as the transmit beam used to transmit the keep-alive signal).

At 812, the network entity 802 may transmit an SSB burst set based at least in part on (or in response to) the keep-alive signal. The UE 804 may receive the SSB burst set transmitted by the network entity 802. In some aspects, based at least in part on receiving the SSB burst set, the UE 804 may transmit a PRACH preamble to the network entity 802 in a RACH occasion associated with an SSB in the SSB burst set to initiate a RACH procedure for the initial access to the cell associated with the network entity 802. In one aspects, a RACH occasion refers to a specific time interval during which the UE can transmit a random access preamble (e.g., PRACH preamble). In some aspects, after transmitting the SSB burst set, the network entity 802 may monitor RACH occasions associated with the SSBs in the SSB burst set, and may receive a PRACH preamble transmission from the UE 804 in a RACH occasion. In some aspects, the UE 804 may receive the SSB burst set on a receiver (Rx) beam selected based at least in part on Rx beam searching performed, by the UE 804, over multiple periodic transmissions of the keep-alive signal.

In some aspects, the network entity 802 may transmit the SSB burst set in connection with receiving the SSB triggering signal from the UE. In some aspects, for the cell in the energy saving mode, the network entity 802 may only transmit the SSB burst set (and perform subsequent monitoring for PRACH preamble transmissions) in connection with receiving the SSB triggering signal from the UE. Alternatively, in some aspects, the network entity 802 may transmit the SSB burst set 812 in connection with receiving the SSB triggering signal 810 in addition to periodic SSB burst set transmissions by the network entity. In some aspects, after each transmission of the keep-alive signal, the network entity 802 may monitor a respective SSB triggering signal occasion offset from the keep-alive signal by a time offset associated with the SSB triggering signal (offset-ToSSBTriggering). The UE 804 may transmit the SSB triggering signal, and the network entity 802 may receive the SSB triggering signal in one of the SSB triggering signal occasions. The network entity 802 may then transmit the SSB burst set based at least in part on receiving the SSB triggering signal from the UE.

In some aspects, the UE 804 may transmit the SSB triggering signal in a resource (e.g., time resource, frequency resource, and/or code or sequence resource) that is associated with the beam (e.g., of multiple beams transmitted by the network entity 802) on which the UE received the keep-alive signal. In this case, the SSB transmitted by the network entity 802 may be based at least in part on the resource (e.g., time resource, frequency resource, and/or code or sequence resource) in which the uplink triggering signal is received by the network entity 802. For example, the network entity 802 may determine, based at least in part on the resource on which the SSB triggering signal is received, an SSB periodicity, an offset of the SSB burst set (e.g., offsetToSSB), and/or a selection of which SSBs, from a set of possible SSBs (e.g., 64 possible SSBs in FR2) are in the SSB burst set.

As described above, the network entity 802 may transmit a keep-alive signal 806 that indicates a presence of a cell in an energy saving mode, and the network entity 802 may transmit an SSB burst set based at least in part on the keep-alive signal and/or the SSB triggering signal. The UE 804 may receive the keep-alive signal, and the UE 804 may receive the SSB burst set based at least in part on the keep-alive signal. In some aspects, the network entity may transmit the SSB burst set with a periodicity that is based at least in part on a periodicity of the keep-alive signal, and the UE 804 may monitor one or more candidate occasions for the SSB burst set determined based at least in part on the periodicity of the keep-alive signal. In some aspects, the UE 804 may transmit an SSB triggering signal to the network entity 802 based at least in part on receiving the keep-alive signal, and the network entity 802 may transmit the SSB burst set based at least in part on receiving the SSB triggering signal from the UE 804. As a result, the network entity 802 may reduce SSB transmissions for the cell in the energy saving mode, resulting in reduced power consumption, and the connection latency may be reduced as compared with turning off the cell and requiring wake-up signaling from a central network entity. Accordingly, the techniques and apparatuses described herein may result in an improved tradeoff between network energy savings and connection latency for a cell in an energy saving mode.

Reduced SSB as KAS

Figure 9:
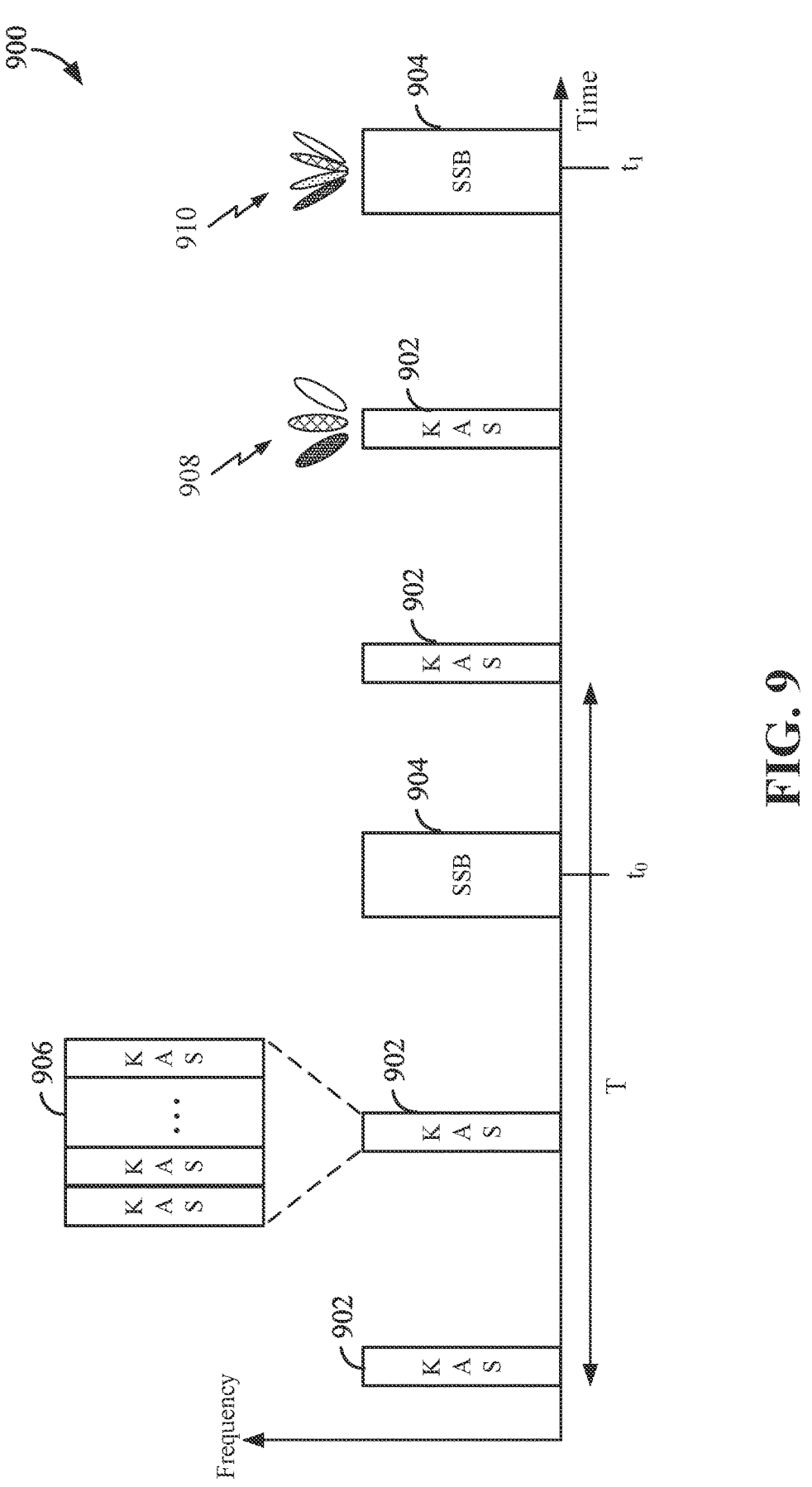
FIG. 9 is a diagram illustrating an example of a keep-alive signal (KAS) according to some aspects.

FIG. 9 is a diagram illustrating an example of keep-alive signal (KAS) implementation 900 according to some aspects. In one example, the network entity 802 can transmit a reduced SSB as a KAS 902 that is sent more frequently than a full SSB. For example, in a time period T, the network entity can send two KAS bursts 902 and one full SSB burst 904. In one aspect, the network entity does not need to send the KAS burst 902 when a full SSB burst 904 is sent in the same occasion. In this disclosure, a full SSB can include all the signals of an SSB (e.g., SSB 715 of FIG. 7), for example, including a PSS, an SSS, and a PBCH. In some aspects, a reduced SSB (i.e., a KAS) can include a subset of the signals of a full SSB (e.g., excluding one or more signals of an SSB). In one example, the KAS 902 can be implemented as a reduced SSB that includes a PSS only. In this case, the PSS-only SSB (reduced SSB) can be effectively used as a KAS. Therefore, the network entity 802 does not need to send a separate KAS when a full SSB is present at the same time (e.g., time to) because the full SSB already includes the PSS. In some aspects, the UE can use the same PSS searcher to detect the KAS/reduced SSB or full SSB, thus the UE can have a simpler implementation.

In some aspects, the KAS 902 (e.g., PSS-only SSB) can use the same ID as the PSS of a full SSB. A PSS ID is a unique identifier that is used to distinguish between different PSS transmitted by different cells. In one aspect, the network entity can send a KAS burst including multiple KAS signals 906 (e.g., N1 number of PSS signals) that are sent with no or minimal gap between KASs (i.e., back-to-back KASs). In one aspect, a KAS beam sweep configuration can be different from that of a full SSB. In one example, the network entity can send N1 number of wider beams 908 (PSS beams) for the KAS 902, and send N2 (N2>N1) number of narrower beams 910 for the full SSB 904. In one aspect, a KAS 902 (e.g., PSS-only SSB) can have a transmit (Tx) signal power different than that of the PSS of a full SSB 904. For example, the KAS can have a higher Tx power to provide a better link budget than the full SSB.

Figure 10:
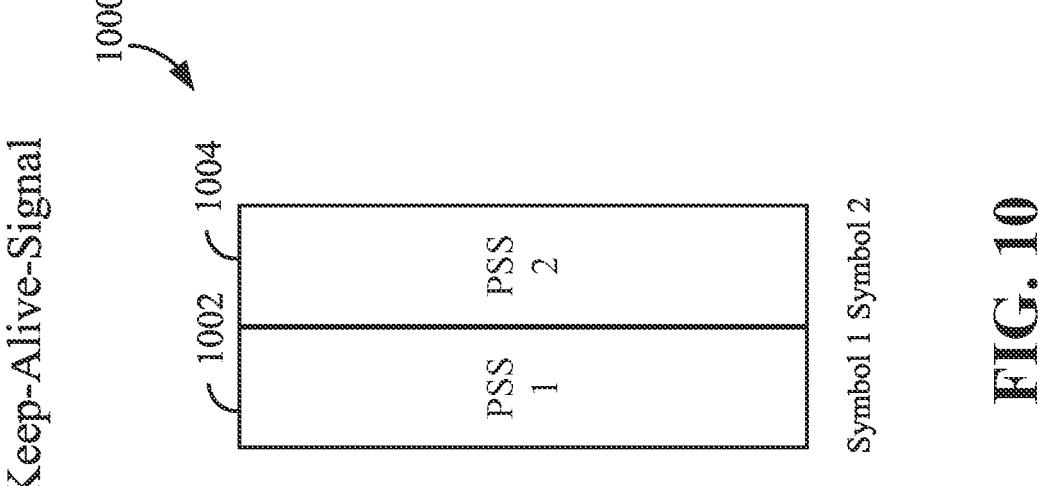
FIG. 10 is a diagram illustrating an exemplary KAS including repeated synchronization signals according to some aspects.

In some aspects, a KAS may include repeated PSSs (e.g., PSS+PSS or back-to-back PSSs) that can facilitate better frequency and/or phase error correction, receive beam refinement, better link budget, and/or improved false detection at the UE. With repeated PSSs in a KAS, the UE can be more confident about whether the detected signal is a full SSB (e.g., PSS+SSS) or a KAS (e.g., PSS+PSS), or a false signal detection. FIG. 10 is a diagram illustrating an exemplary KAS 1000 that includes repeated PSSs. In one example, the KAS 1000 can include a first PSS 1002 and a second PSS 1004 (repeated PSS). The network entity can transmit the first PSS 1002 and the second PSS 1004 in different symbols (e.g., symbol 1 and symbol 2). In some examples, the first PSS 1002 and second PSS 1004 may be located in adjacent symbols. In some examples, the first PSS 1002 and the second PSS 1004 may be separated by one or more symbols.

Figure 11:
FIG. 11 is a diagram illustrating an exemplary KAS configuration according to some aspects.

In some aspects, a KAS configuration can include various parameters. FIG. 11 illustrates an exemplary KAS configuration 1100 that provides one or more parameters, for example, a PSS power offset, a beam sweep pattern, PSS repetition information, quasi co-location (QCL) relation information between KAS and SSB, and periodicity and offset. The PSS power offset parameter can indicate the KAS power (e.g., PSS power) relative to (offset) the SSB PSS power. The beam sweep pattern parameter can indicate the beam sweeping pattern of the KAS. For example, the KAS (e.g., PSS) can have a different (e.g., wider, narrower, and/or number of beams) or a same beam sweeping pattern as the full SSB PSS. The PSS repetition information can indicate whether the KAS uses PSS repetition or not. The QCL relation parameter can indicate whether or not the KAS is QCL'ed with the SSB. When KAS and SSB are QCL'ed, KAS and SSB transmissions may experience similar channel conditions. The periodicity and offset parameter can indicate the periodicity of the KAS and/or its timing offset from the full SSB (e.g., PSS).

In some aspects, the KAS configuration can be indicated, preconfigured, or defined in a wireless communication standard (e.g., 3GPP specification). In one example, the KAS configuration can be indicated by a network entity (e.g., base station, gNB, etc.) of the same or a neighboring cell to the UE. In one aspect, a cell (e.g., a network entity of the same or a neighboring cell) can transmit the KAS configuration in a broadcast signal (e.g., MIB, SIB1, other SIBs) or in a dedicated or UE-specific signal (e.g., RRC signal, SSB based measurement timing configuration (SMTC), etc.). In some aspects, the KAS configuration can be communicated among different network entities for network coordination purposes. In one example, the KAS configuration can be sent over an F1 interface between a CU and a DU. In one example, the KAS configuration can be sent over an Xn interface between base stations (e.g., CUs or gNBs).

Figure 12:
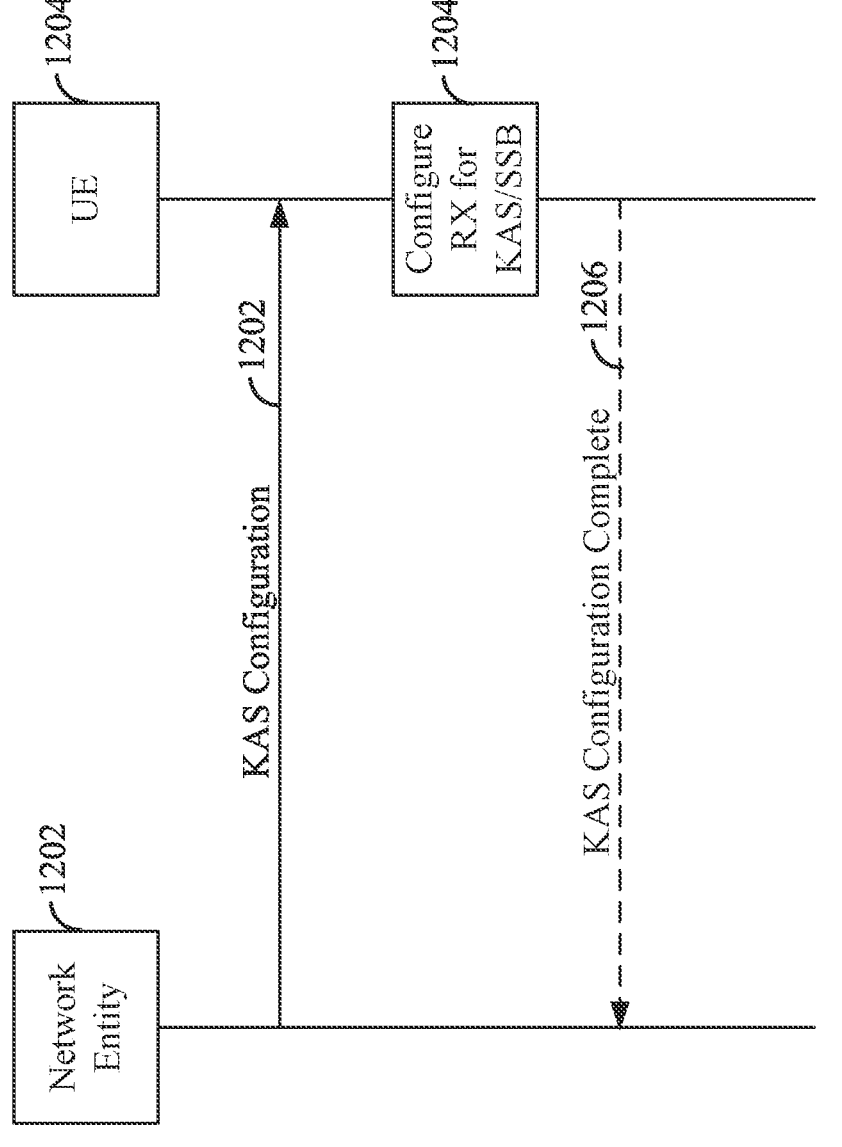
FIG. 12 is a diagram illustrating an example of communication between a network entity and a UE for indicating a KAS configuration according to some aspects.

FIG. 12 is a diagram illustrating an example of communication between a network entity 1202 and a UE 1204 for indicating a KAS configuration according to some aspects. In one example, the network entity 1202 may be any of the network entities described above in relation to FIGS. 1-11. In one example, the UE 1204 may be any of the UEs described above in relation to FIGS. 1-11. At 1202, the network entity can indicate a KAS configuration to the UE. In one example, the network entity can send the KAS configuration to the UE using a broadcast signal (e.g., MIB, SIB1, other SIBs) or a dedicated signal (e.g., an RRC Reconfiguration message). In some aspects, the network entity can indicate a KAS configuration among a plurality of predefined or preconfigured KAS configurations that are known to the UE. At 1204, the UE can save the KAS configuration and configure its wireless communication software and/or hardware to search for the KAS (e.g., PSS) or SSB from the network based on the KAS configuration. In some examples, the network entity 802 may be a network entity (e.g., gNB, CU. DU, etc.) of a cell (e.g., a neighbor cell) that is different from a cell in which the UE will receive the KAS or SSB. At 1206, optionally, the UE may send an acknowledgment or confirmation (e.g., KAS configuration complete) message to the network entity to indicate that the UE has received the KAS configuration.

SSB Bursts with Different Beam Sweeping Patterns

Figure 13:
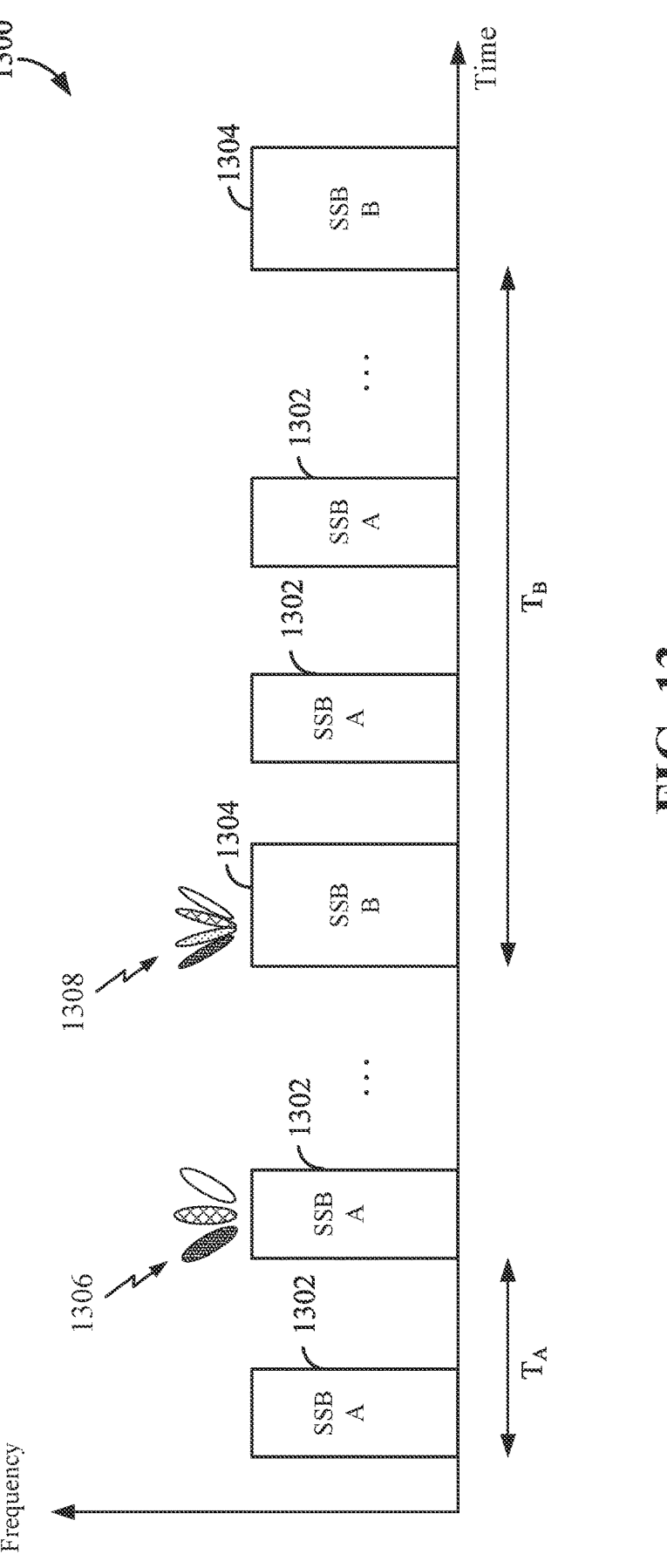
FIG. 13 is a diagram illustrating some examples of synchronization signal block (SSB) bursts having different beam sweeping patterns according to some aspects.

In some aspects, a network entity (e.g., network entity 1202) can transmit SSB bursts using different beam sweeping patterns according to some aspects, and one of the beam sweeping patterns can be used for a KAS burst. FIG. 13 is a diagram illustrating some examples of SSB bursts having different beam sweeping patterns according to some aspects. In one example, the network entity can transmit a first SSB burst 1302 (e.g., SSB burst A) and a second SSB burst 1304 (e.g., SSB burst B) using different beam sweeping patterns. In one aspect, SSB burst B can be a full SSB burst, and SSB burst A can be a reduced SSB burst that can be used as a KAS. In some aspects, the first SSB burst 1302 (SSB burst A) can consume less energy than the second SSB burst 1304 (SSB burst B). Therefore, the network entity can reduce power consumption by transmitting the second SSB burst 1302 as a KAS. In one example, SSB burst A can use a first beam sweeping pattern 1306, and SSB burst B can use a second beam sweeping pattern 1308 that is different from the first beam sweeping pattern 1306 in one or more aspects. The network entity can indicate the configuration of SSB burst A and SSB burst B using a KAS configuration and related procedures similar to those described above in relation to FIGS. 11 and 12.

In one example, SSB burst A can have a shorter burst and shorter periodicity TA (e.g., 8 beams burst every 20 milliseconds (msec)), and SSB burst B can have a longer burst and longer periodicity TB (e.g., 32 beams burst every 80 msec) than the SSB burst A. In one example, SSB burst A can use wider and shorter beams than SSB burst B. In this case, shorter beams of SSB burst A can still be sufficient for SSB detection at the UE, and narrower and longer beams of SSB burst B can facilitate RMSI/RACH detection and improved link budget. In some aspects, the UE may not use SSB burst A (short burst/KAS) for RMSI or a random access channel procedure. In some aspects, the PBCH content of the short burst (SSB burst A) can provide assisting information about the position of the long burst (SSB burst B), QCL relation between long SSB bursts and short SSB bursts, etc.

Figure 14:
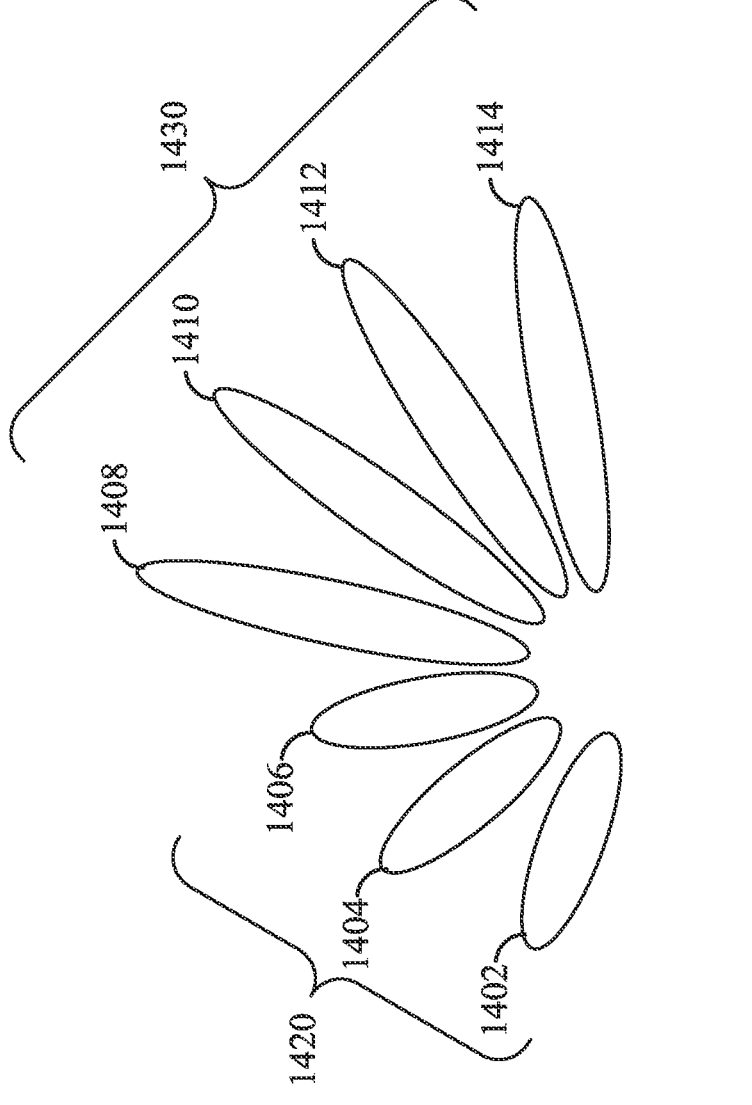
FIG. 14 is a drawing illustrating an exemplary SSB burst beam sweeping pattern according to some aspects.

FIG. 14 is a drawing illustrating a full SSB burst beam sweeping pattern 1400 according to some aspects. The SSB burst B of FIG. 13 can use the beam sweeping pattern 1400 that includes a number of beams (e.g., beams 1402, 1404, 1406, 1408, 1410, 1412, and 1414 shown in FIG. 14). In one example, the initial N beams of SSB burst B can be the same as those of SSB burst A. In this case, the initial short burst 1420 (e.g., beams 1402, 1404, and 1406) may be periodic and present in both SSB burst A and SSB burst B. The SSB burst B has additional beams 1430 (e.g., beams 1408, 1410, 1412, and 1414) that may be narrower than the those (e.g., beams 1402, 1404, and 1406) included in the short bursts. In some examples, certain QCL mapping rules can be defined between the beams of short bursts and long bursts to facilitate beam detection at the UE.

Figure 15:
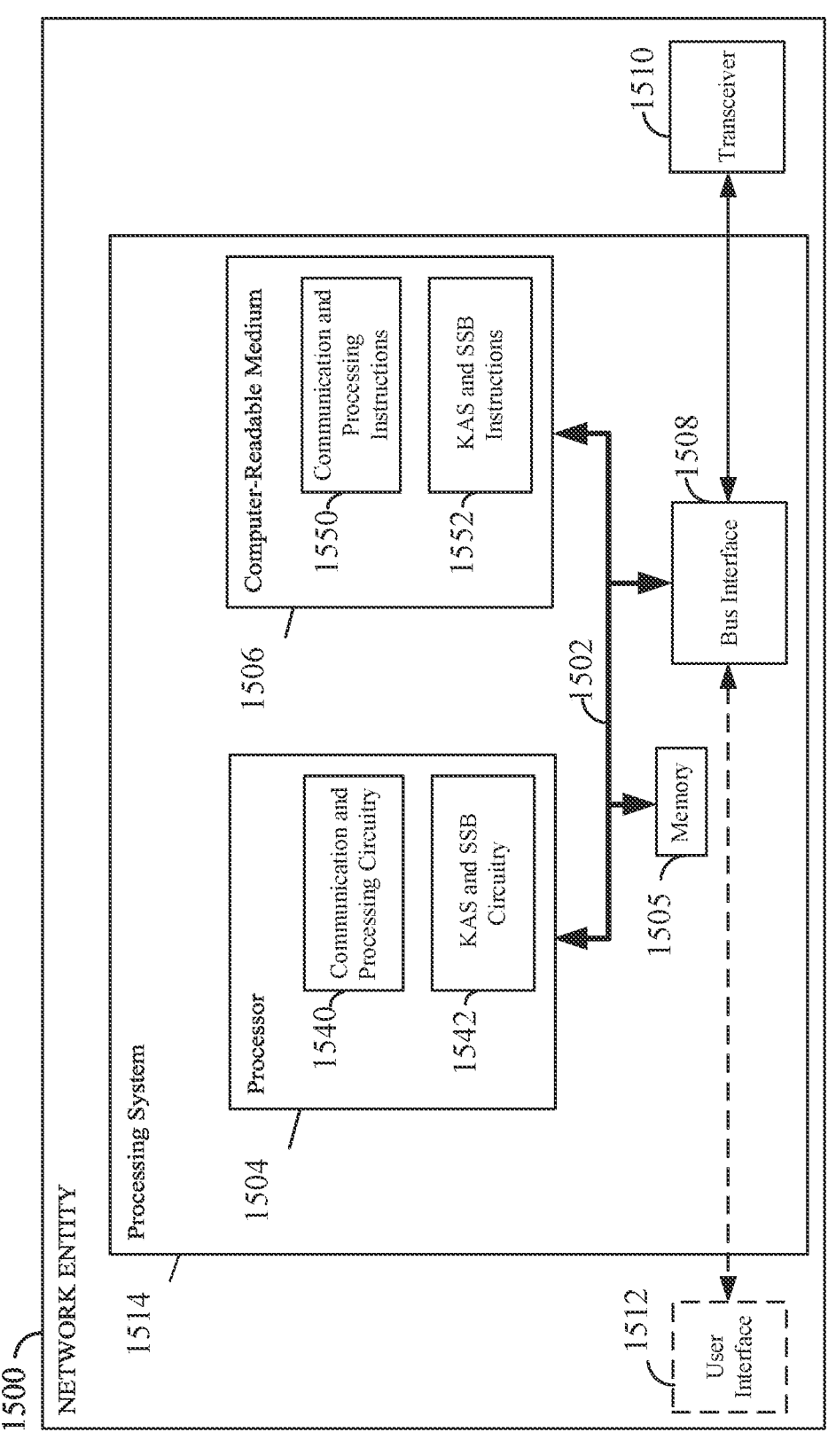
FIG. 15 is a block diagram illustrating an example of a hardware implementation for a network entity according to some aspects.

FIG. 15 is a block diagram illustrating an example of a hardware implementation for a network entity 1500 employing a processing system 1514. For example, the network entity 1500 may be a scheduling entity or base station as illustrated in any one or more of FIGS. 1, 2, 3, 6, 8, and/or 12. The network entity 1500 may further be implemented in an aggregated or monolithic base station architecture, or in a disaggregated base station architecture, and may include one or more of a CU, a DU, a RU, a Near-RT RIC, or a Non-RT RIC.

The network entity 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1500 may be configured to perform any one or more of the functions described herein. That is, the processor 1504, as utilized in a network entity 1500, may be used to implement any one or more of the processes and procedures described below and illustrated in FIGS. 8-14, 16, 17, and 18.

The processor 1504 may in some instances be implemented via a baseband or modem chip and in other implementations, the processor 1504 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. Depending upon the nature of the apparatus, a user interface 1512 (e.g., keypad, display, speaker, microphone, joystick, touch screen) may also be provided. Of course, such a user interface 1512 is optional, and may be omitted in some examples, such as a base station.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1504 may include circuitry configured for various functions, including, for example, KAS and SSB transmissions for network energy saving in a wireless network. For example, the circuitry may be configured to implement one or more of the functions described in relation to FIGS. 16 and 17.

In some aspects of the disclosure, the processor 1504 may include communication and processing circuitry 1540 configured for various functions, including for example communicating with a network core (e.g., a 5G core network), scheduled entities (e.g., UE), or any other entity, such as, for example, local infrastructure or an entity communicating with the network entity 1500 via the Internet, such as a network provider. In some examples, the communication and processing circuitry 1540 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1540 may include one or more transmit/receive chains. In addition, the communication and processing circuitry 1540 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1540 may further be configured to execute communication and processing software 1550 stored on the computer-readable medium 1506 to implement one or more functions described herein.

In some implementations where the communication involves receiving information, the communication and processing circuitry 1540 may obtain information from a component of the network entity 1500 (e.g., from the transceiver 1510 that receives the information via radio frequency signaling or some other type of signaling suitable for the applicable communication medium), process (e.g., decode) the information, and output the processed information. For example, the communication and processing circuitry 1540 may output the information to another component of the processor 1504, to the memory 1505, or to the bus interface 1508. In some examples, the communication and processing circuitry 1540 may receive one or more of signals, messages, other information, or any combination thereof. In some examples, the communication and processing circuitry 1540 may receive information via one or more channels. In some examples, the communication and processing circuitry 1540 may include functionality for a means for receiving. In some examples, the communication and processing circuitry 1540 may include functionality for a means for processing, including a means for demodulating, a means for decoding, etc.

In some implementations where the communication involves sending (e.g., transmitting) information, the communication and processing circuitry 1540 may obtain information (e.g., from another component of the processor 1504, the memory 1505, or the bus interface 1508), process (e.g., modulate, encode, etc.) the information, and output the processed information. For example, the communication and processing circuitry 1540 may output the information to the transceiver 1510 (e.g., that transmits the information via radio frequency signaling or some other type of signaling suitable for the applicable communication medium). In some examples, the communication and processing circuitry 1540 may send one or more of signals, messages, other information, or any combination thereof. In some examples, the communication and processing circuitry 1540 may send information via one or more channels. In some examples, the communication and processing circuitry 1540 may include functionality for a means for sending (e.g., a means for transmitting). In some examples, the communication and processing circuitry 1540 may include functionality for a means for generating, including a means for modulating, a means for encoding, etc.

In some aspects of the disclosure, the processor 1504 may include KAS and SSB circuitry 1542 configured for various functions, for example, KAS and SSB configuration and transmission. The KAS and SSB circuitry 1542 may further be configured to execute KAS and SSB instructions 1552 stored on the computer-readable medium 1506 to implement one or more functions described herein. The KAS and SSB circuitry 1542 can be configured to use the communication and processing circuitry 1540 and transceiver 1510 to transmit a KAS and/or an SSB as described herein. In one aspect, the KAS and SSB circuitry 1542 can configure the KAS to include one or more PSSs. In one aspect, the KAS and SSB circuitry 1542 can configure the KAS to be a reduced SSB burst.

In some aspects, the KAS and SSB circuitry 1542 can configure the communication and processing circuitry 1540 to transmit a KAS using a first beam sweeping pattern and transmit an SSB (e.g., full or nominal SSB) using a second beam sweeping pattern that is different from the first beam sweeping pattern in terms of at least one of a beam width or a number of beams. In one aspect, the KAS and SSB circuitry 1542 can configure the communication and processing circuitry 1540 to transmit a KAS (e.g., reduced SSB) using a first transmit power and transmit an SSB (e.g., full or nominal SSB) using a second transmit power that is different from the first transmit power.

In some aspects, the KAS and SSB circuitry 1542 can configure the communication and processing circuitry 1540 to transmit a KAS configuration to a UE. The KAS configuration can include one or more parameters, for example, a power offset of the KAS relative to the SSB, a beam sweeping pattern of the KAS, a KAS repetition indication, QCL relation information between the KAS and the SSB, a periodicity of the KAS, and/or a timing offset of the KAS relative to the SSB. The KAS and SSB circuitry 1542 can configure the communication and processing circuitry 1540 to transmit the KAS configuration using a broadcast signal or a UE-specific signal. In some aspects, the KAS and SSB circuitry 1542 can configure the communication and processing circuitry 1540 to transmit the KAS configuration to a different network entity (e.g., gNB, CU, etc.).

Figure 16:
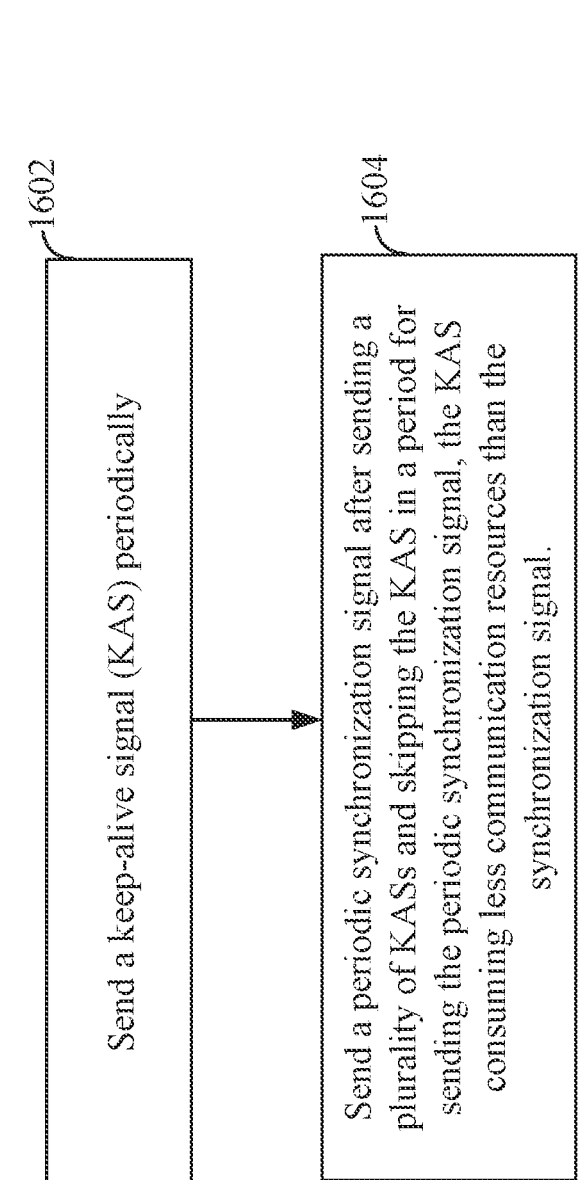
FIG. 16 is a flow chart illustrating an exemplary process for sending a keep-alive signal (KAS) according to some aspects.

FIG. 16 is a flow chart illustrating an exemplary process 1600 for sending a KAS in accordance with some aspects of the present disclosure. As described below, some or all illustrated features may be omitted in a particular implementation within the scope of the present disclosure, and some illustrated features may not be required for the implementation of all examples. In some examples, the process 1600 may be carried out by the network entity 1500 illustrated in FIG. 15. In some examples, the process 1600 may be carried out by any suitable apparatus or means for carrying out the functions or algorithm described below.

At block 1602, a network entity (e.g., a scheduling entity, base station, gNB, CU, DU) can send a keep-alive signal (KAS) periodically. The KAS can indicate a presence of a cell associated with the network entity in an energy saving mode. In one aspect, the communication and processing circuitry 1540 can provide a means to send the KAS via the transceiver 1510. At block 1604, the network entity can send a periodic synchronization signal (e.g., SSB burst) after sending a plurality of KASs and skipping the KAS in a period for sending the periodic synchronization signal. In some aspects, the KAS may be the KAS 902 of FIG. 9 or the SSB burst 1304 of FIG. 13. The KAS can consume less communication resources (e.g., time and/or frequency resources) than the synchronization signal. In one aspect, the communication and processing circuitry 1540 can provide a means to send the synchronization signal via the transceiver 1510.

In some aspects, the KAS may be a reduced SSB and the synchronization signal may be a full SSB. In some aspects, the KAS and the synchronization signal may be SSB bursts that are different in terms of a burst length, a number of beams, a beam width, a transmit power, and/or a periodicity. In one aspect, the KAS and SSB circuitry 1542 can provide a means to configure the KAS and the synchronization signal for transmission by the transceiver 1510. In some aspects, the KAS and SSB circuitry 1542 can provide a means to configure a burst length, a periodicity, a beam width, a beam sweeping pattern, a repetition pattern, and/or a transmit power of the KAS and the synchronization signal.

Figure 17:
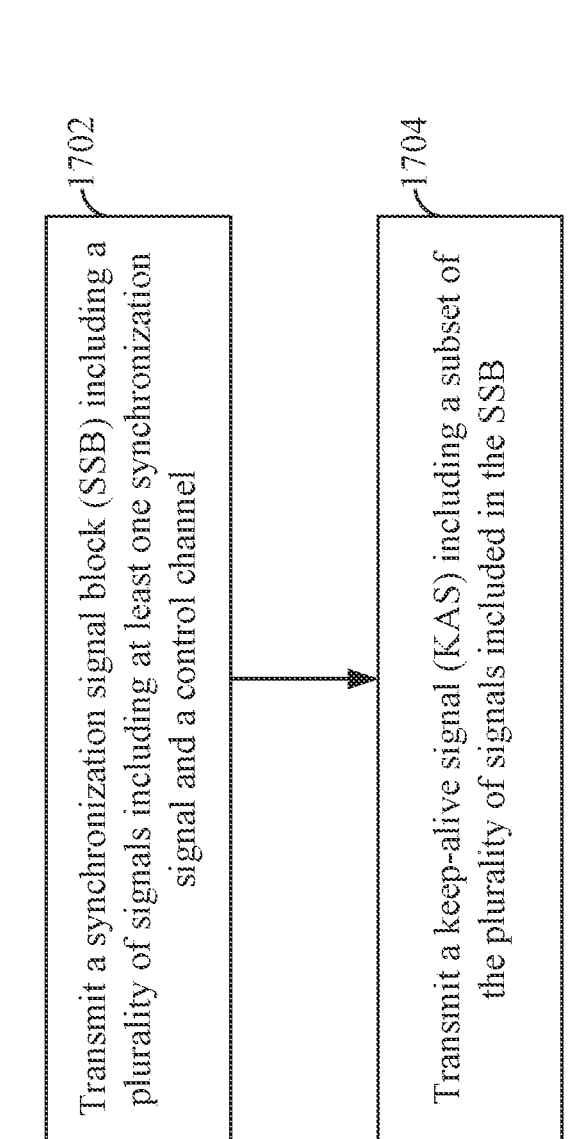
FIG. 17 is a flow chart illustrating an exemplary process for transmitting a keep-alive signal including a reduced SSB according to some aspects.

FIG. 17 is a flow chart illustrating an exemplary process 1700 for transmitting a keep-alive signal in accordance with some aspects of the present disclosure. As described below, some or all illustrated features may be omitted in a particular implementation within the scope of the present disclosure, and some illustrated features may not be required for the implementation of all examples. In some examples, the process 1700 may be carried out by the network entity 1500 illustrated in FIG. 15. In some examples, the process 1700 may be carried out by any suitable apparatus or means for carrying out the functions or algorithm described below.

At block 1702, a network entity (e.g., a scheduling entity, base station, gNB, CU. DU) transmits an SSB including a plurality of signals, for example, including at least one synchronization signal and a control channel. For example, the SSB may include a PSS, an SSS, and a PBCH similar to those illustrated in FIG. 7. In one aspect, the communication and processing circuitry 1540 can provide a means to transmit the SSB. In some example, the network entity can transmit an SSB burst (e.g., SSB burst 904) including a plurality of SSB at a certain periodicity.

At block 1704, the network entity can transmit a keep-alive signal (KAS) including a subset of the plurality of signals included in the SSB. In one example, the KAS may include a PSS without the SSS or PBCH. The network entity can transmit a KAS burst including a plurality of PSSs. In one aspect, the communication and processing circuitry 1540 can provide a means to transmit the KAS. In one aspect, the KAS and SSB circuitry 1542 can provide a means to configure KAS and SSB transmissions. In some aspects, the KAS and SSB circuitry 1542 can configure a periodicity, a beam width, a beam sweeping pattern, a repetition pattern, and/or a transmit power of the KAS and SSB based on a KAS configuration. In one aspect, the KAS and SSB circuitry 1542 can provide a means to send or indicate the KAS configuration to a UE.

In one aspect, the network entity can transmit the KAS (e.g., a KAS burst) at a first periodicity, and transmit the SSB (e.g., an SSB burst) at a second periodicity that is longer than the first periodicity. In one aspect, the KAS includes a PSS (without SSS and PBCH) that may be the same as the SSB PSS. In one aspect, the KAS can include a repetition of the PSS across a plurality of symbols of the KAS. For example, the KAS may include two repeated PSSs across two or more symbols. Repeated PSSs can be used by a UE for frequency and/or phase error correction, RX beam refinement, improving link budget, and/or false detection. For example, repeated PSSs in a KAS allows the UE to determine whether the received signal is a full SSB (e.g., PSS+SSS), a KAS (PSS+PSS), or other signals.

In some aspects, the KAS configuration can include various information, for example, a power offset of the KAS relative to the SSB, a beam sweeping pattern of the KAS, a KAS repetition indication, QCL relation information between the KAS and the SSB, a periodicity of the KAS, and/or a timing offset of the KAS relative to the SSB. The network entity can transmit the KAS configuration using a broadcast signal (e.g., MIB, SIB1, or other SIBs) or a UE-specific signal (e.g., RRC signal).

FIG. 18 is a flow chart illustrating an exemplary process 1800 for transmitting SSB bursts in accordance with some aspects of the present disclosure. As described below, some or all illustrated features may be omitted in a particular implementation within the scope of the present disclosure, and some illustrated features may not be required for the implementation of all examples. In some examples, the process 1800 may be carried out by the network entity 1500 illustrated in FIG. 15. In some examples, the process 1800 may be carried out by any suitable apparatus or means for carrying out the functions or algorithm described below.

At block 1802, a network entity (e.g., a scheduling entity, base station, gNB) can transmit a first SSB burst using a first beam sweeping pattern. The first SSB burst is configured to indicate a presence of a cell associated with the network entity in an energy saving mode. In one aspect, the communication and processing circuitry 1540 can provide a means to transmit the first SSB burst via the transceiver 1510. At block 1804, the network entity can transmit a second SSB burst using a second beam sweeping pattern. The first beam sweeping pattern and the second beam sweeping pattern can be different in terms of at least one of a number of beams, a beam width, or a periodicity. In one aspect, the KAS and SSB circuitry 1542 can provide a means to configure the first and second SSB bursts for transmission by the transceiver 1510.

In some aspects, the second SSB burst can be a KAS burst or a reduced SSB burst that can be detected by a UE as a KAS. In some aspects, the KAS and SSB circuitry 1542 can provide a means to configure a periodicity, a beam width, a beam sweeping pattern, a repetition pattern, and/or a transmit power of an SSB burst. In one aspect, the network entity can transmit the first SSB burst at a first periodicity, and transmit the second SSB burst at a second periodicity that is longer than the first periodicity. In one aspect, the first SSB burst can have a fewer number of beams and a shorter periodicity than the second SSB burst. In one aspect, at least one beam of the first SSB burst can have a wider beam width than one or more beams of the second SSB burst. In one example, the first SSB burst has a total of N beams, and the second SSB burst has M (M>N) beams. The initial N beams of the second SSB burst can be the same as the N beams of the first SSB burst in terms of at least one of a beam width and a periodicity.

In one aspect, the first SSB burst can include assistance information for helping the detection of the second SSB burst by a UE. For example, the assistance information may include at least one of: a power offset of the first SSB burst relative to the second SSB burst; a beam sweeping pattern of the first SSB burst and a beam sweeping pattern of the second SSB burst; QCL relation information between the first SSB burst and the second SSB burst; a periodicity of the first SSB burst and a periodicity of the second SSB burst; or a timing offset of the first SSB burst relative to the second SSB burst.

In one configuration, the network entity 1500 for wireless communication includes means for transmitting an SSB burst and a KAS burst for network energy saving as described herein. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 3, 5, 6, 8, and/or 12, and utilizing, for example, the processes and/or algorithms described herein in relation to FIGS. 8-14, and/or 16-18.

Figure 19:
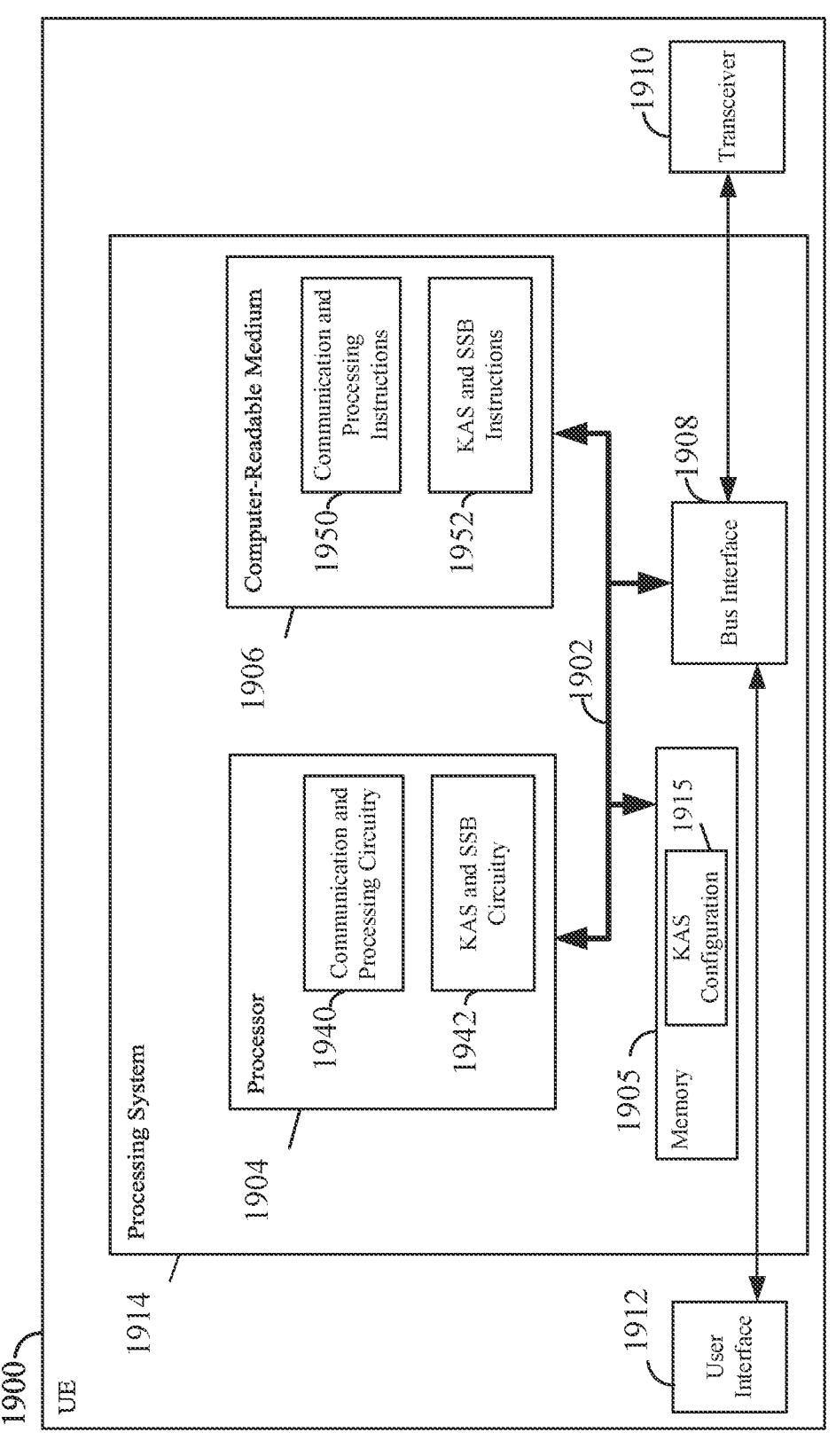
FIG. 19 is a block diagram illustrating an example of a hardware implementation for a user equipment according to some aspects of the disclosure.

FIG. 19 is a diagram illustrating an example of a hardware implementation for an exemplary UE 1900 employing a processing system 1914. In accordance with various aspects of the disclosure, an element, or any portion of an element, or any combination of elements may be implemented with a processing system 1914 that includes one or more processors 1904. For example, the UE 1900 may be a UE or scheduled entity as illustrated in any one or more of FIGS. 1, 2, 6, 8, and/or 12.

The processing system 1914 may be substantially the same as the processing system 1514 illustrated in FIG. 15, including a bus interface 1908, a bus 1902, memory 1905, a processor 1904, and a computer-readable medium 1906. Furthermore, the UE 1900 may include a user interface 1912 and a transceiver 1910 substantially similar to those described above in FIG. 15. That is, the processor 1904, as utilized in the UE 1900, may be used to implement any one or more of the processes described and illustrated in FIGS. 8-14, 20, 21, and 22.

In some aspects of the disclosure, the processor 1904 may include circuitry configured for various functions, including, for example, KAS and SSB transmission for network energy saving. For example, the circuitry may be configured to implement one or more of the functions described below in relation to FIGS. 18 and 19.

In some aspects of the disclosure, the processor 1904 may include communication and processing circuitry 1940 configured for various functions, including for example communicating with a network entity or scheduling entity (e.g., a base station or gNB). In some examples, the communication and processing circuitry 1940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1940 may include one or more transmit/receive chains. In addition, the communication and processing circuitry 1940 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1940 may further be configured to execute communication and processing software 1950 stored on the computer-readable medium 1906 to implement one or more functions described herein.

In some implementations where the communication involves receiving information, the communication and processing circuitry 1940 may obtain information from a component of the UE 1900 (e.g., from the transceiver 1910 that receives the information via radio frequency signaling or some other type of signaling suitable for the applicable communication medium), process (e.g., decode) the information, and output the processed information. For example, the communication and processing circuitry 1940 may output the information to another component of the processor 1904, to the memory 1905, or to the bus interface 1908. In some examples, the communication and processing circuitry 1940 may receive one or more of signals, messages, other information, or any combination thereof. In some examples, the communication and processing circuitry 1940 may receive information via one or more channels. In some examples, the communication and processing circuitry 1940 may include functionality for a means for receiving. In some examples, the communication and processing circuitry 1940 may include functionality for a means for processing, including a means for demodulating, a means for decoding, etc.

In some implementations where the communication involves sending (e.g., transmitting) information, the communication and processing circuitry 1940 may obtain information (e.g., from another component of the processor 1904, the memory 1905, or the bus interface 1908), process (e.g., modulate, encode, etc.) the information, and output the processed information. For example, the communication and processing circuitry 1940 may output the information to the transceiver 1910 (e.g., that transmits the information via radio frequency signaling or some other type of signaling suitable for the applicable communication medium). In some examples, the communication and processing circuitry 1940 may send one or more of signals, messages, other information, or any combination thereof. In some examples, the communication and processing circuitry 1940 may send information via one or more channels. In some examples, the communication and processing circuitry 1940 may include functionality for a means for sending (e.g., a means for transmitting). In some examples, the communication and processing circuitry 1940 may include functionality for a means for generating, including a means for modulating, a means for encoding, etc.

In some aspects of the disclosure, the processor 1904 may include KAS and SSB circuitry 1942 configured for various functions, for example, receiving and processing KAS and SSB bursts from a network entity (e.g., a base station or gNB). The KAS and SSB circuitry 1942 may further be configured to execute KAS and SSB software 1952 stored on the computer-readable medium 1906 to implement one or more functions described herein. The KAS and SSB circuitry 1942 can be configured to use the communication and processing circuitry 1940 to receive KAS and SSB bursts based on a KAS configuration 1915 stored in the memory 1905. In one example, a KAS may include a reduced SSB (e.g., PSS only SSB). In one aspect, a KAS can include a repetition of PSSs across two or more symbols. The KAS and SSB circuitry 1942 can configure the communication and processing circuitry 1940 to receive a reduced SSB burst or KAS burst including a plurality of PSSs.

The KAS and SSB circuitry 1942 can configure the communication and processing circuitry 1940 to receive a KAS burst using a first beam sweeping pattern and receive a SSB burst using a second beam sweeping pattern that is different from the first beam sweeping pattern in terms of at least one of a beam width or a number of beams. The KAS and SSB circuitry 1942 can configure the communication and processing circuitry 1940 to receive a KAS burst using a first transmit power and receive an SSB burst using a second transmit power that is different from the first transmit power.

The KAS and SSB circuitry 1942 can configure the communication and processing circuitry 1940 to receive the KAS configuration 1915 from the network entity. The KAS configuration can include one or more of: a power offset of the KAS relative to the SSB; a beam sweeping pattern of the KAS; a KAS repetition indication; QCL relation information between the KAS and the SSB; a periodicity of the KAS; and a timing offset of the KAS relative to the SSB. The KAS and SSB circuitry 1942 can configure the communication and processing circuitry 1940 to receive the KAS configuration using a broadcast signal or a UE-specific signal via the transceiver 1910.

Figure 20:
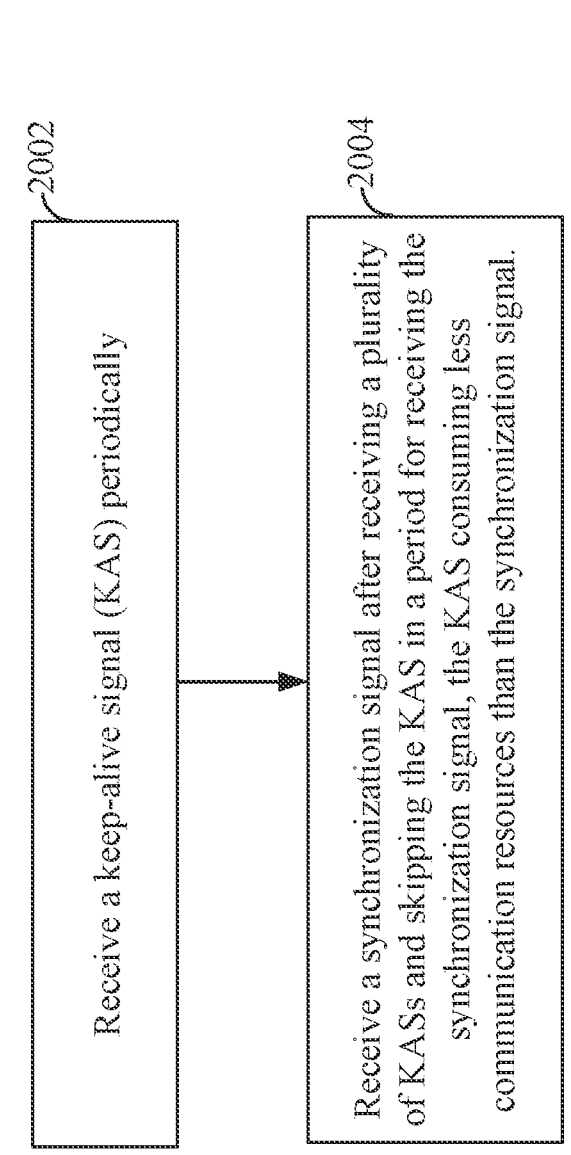
FIG. 20 is a flow chart illustrating an exemplary process for receiving a keep-alive signal (KAS) according to some aspects.

FIG. 20 is a flow chart illustrating an exemplary process 2000 for receiving a KAS in accordance with some aspects of the present disclosure. As described below, some or all illustrated features may be omitted in a particular implementation within the scope of the present disclosure, and some illustrated features may not be required for the implementation of all examples. In some examples, the process 2000 may be carried out by the UE 1900 illustrated in FIG. 19. In some examples, the process 2000 may be carried out by any suitable apparatus or means for carrying out the functions or algorithm described below.

At block 2002, a UE can receive a keep-alive signal (KAS) periodically. The KAS can indicate a presence of a cell associated with a network entity in an energy saving mode. In one aspect, the communication and processing circuitry 1940 can provide a means to receive the KAS via the transceiver 1910. At block 2004, the UE can receive a periodic synchronization signal (e.g., SSB burst) after receiving a plurality of KASs and skipping the KAS in a period for receiving the synchronization signal. In some aspects, the KAS may be the KAS 902 of FIG. 9 or the SSB burst 1304 of FIG. 13. The KAS can consume less communication resources (e.g., time and/or frequency resources) than the synchronization signal. In one aspect, the communication and processing circuitry 1940 can provide a means to receive the synchronization signal via the transceiver 1910.

In some aspects, the KAS may be a reduced SSB and the synchronization signal may be a full SSB. In some aspects, the KAS and the synchronization signal may be SSB bursts that are different in terms of a burst length, a number of beams, a beam width, a transmit power, and/or a periodicity. In one aspect, the KAS and SSB circuitry 1942 can provide a means to configure the communication and processing circuitry 1940 to receive the KAS and the synchronization signal via the transceiver 1910.

Figure 21:
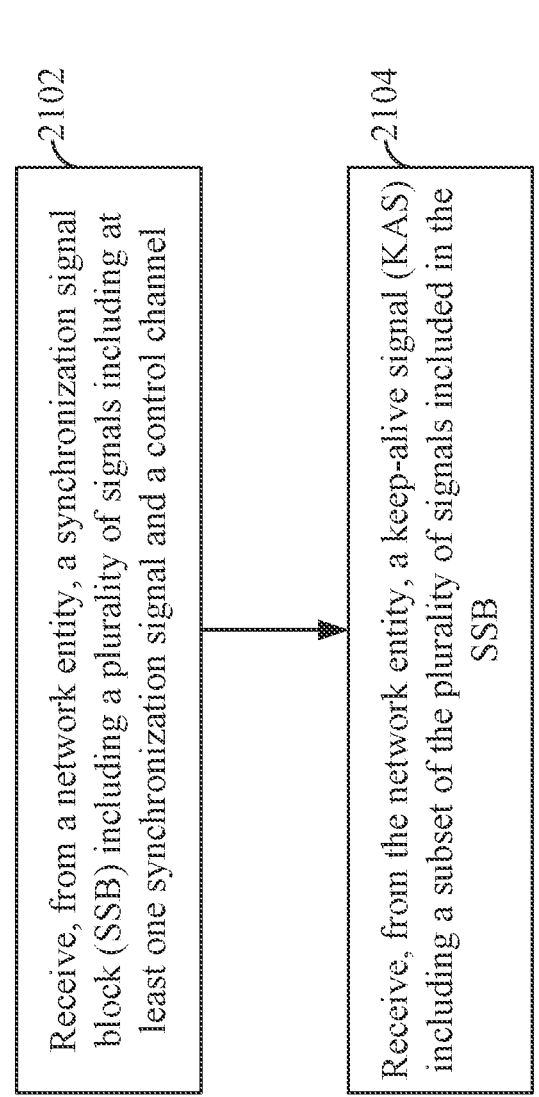
FIG. 21 is a flow chart illustrating an exemplary process for receiving a keep-alive signal including a reduced SSB according to some aspects.

FIG. 21 is a flow chart illustrating an exemplary process 2100 for receiving a KAS in accordance with some aspects of the present disclosure. As described below, some or all illustrated features may be omitted in a particular implementation within the scope of the present disclosure, and some illustrated features may not be required for the implementation of all examples. In some examples, the process 2100 may be carried out by the UE 1900 illustrated in FIG. 19. In some examples, the process 2100 may be carried out by any suitable apparatus or means for carrying out the functions or algorithm described below.

At block 2102, a UE can receive an SSB including a plurality of signals, for example, including at least one synchronization signal and a control channel. For example, the SSB may be a full SSB including a PSS, an SSS, and a PBCH similar to those illustrated in FIG. 7. In one aspect, the communication and processing circuitry 1940 can provide a means to receive the SSB via the transceiver 1910. In some examples, the UE can receive an SSB burst including a plurality of SSB.

At block 2104, the UE can receive a KAS including a subset of the plurality of signals included in the SSB. For example, the KAS may be a reduced SSB including a PSS without the SSS and PBCH. In one aspect, the UE can receive a KAS burst including a plurality of KASs (e.g., PSSs). In one aspect, the communication and processing circuitry 1940 can provide a means to receive the KAS. In one aspect, the KAS and SSB circuitry 1942 can provide a means to configure the communication and processing circuitry 1940 to receive a KAS and/or an SSB from a network entity. In some aspects, the KAS and SSB circuitry 1942 can configure the periodicity, beam width, beam sweeping pattern, repetition pattern, and/or transmit power of the KAS and SSB, for example, according to a KAS configuration 1915. In one aspect, the memory 1905 can provide a means to store the KAS configuration in the UE. The communication and processing circuitry 1940 can provide a means to receive and process the KAS configuration from a network entity.

In one aspect, the UE can receive the KAS (e.g., KAS burst) at a first periodicity, and receive the SSB (e.g., SSB burst) at a second periodicity that is longer than the first periodicity. In one aspect, the KAS includes a PSS that is the same as the SSB PSS. In one aspect, the KAS can include a repetition of the PSS across a plurality of symbols of the KAS. For example, the KAS may include two repeated PSSs across two or more symbols. Repeated PSSs can help the UE in frequency and/or phase error correction, RX beam refinement, improved link budget, and/or false KAS/SSB detection. For example, including repeated PSSs in a KAS allows the UE to determine whether the received signal is an SSB (PSS+SSS), a KAS (PSS+PSS), or other signals.

In some aspects, the KAS configuration can include at least one of: a power offset of a KAS relative to an SSB; a beam sweeping pattern of a KAS; a KAS repetition indication; QCL relation information between a KAS and an SSB; a periodicity of a KAS; or a timing offset of a KAS relative to an SSB. The network can transmit a KAS configuration using a broadcast signal (e.g., MIB, SIB1, or other SIBs) or a UE-specific signal (e.g., RRC signal).

FIG. 22 is a flow chart illustrating an exemplary process 2200 for receiving different SSB bursts in accordance with some aspects of the present disclosure. As described below, some or all illustrated features may be omitted in a particular implementation within the scope of the present disclosure, and some illustrated features may not be required for the implementation of all examples. In some examples, the process 2200 may be carried out by the UE 1900 illustrated in FIG. 19. In some examples, the process 2200 may be carried out by any suitable apparatus or means for carrying out the functions or algorithm described below.

At block 2202, a UE can receive a first SSB burst using a first beam sweeping pattern. The first SSB burst is configured to indicate a presence of a cell associated with the network entity in an energy saving mode. In one aspect, the communication and processing circuitry 1940 can provide a means to receive the first SSB burst via the transceiver 1910. At block 2204, the UE can receive a second SSB burst using a second beam sweeping pattern. In one aspect, the communication and processing circuitry 1940 can provide a means to receive the second SSB burst via the transceiver 1910. The first beam sweeping pattern and the second beam sweeping pattern are different in terms of at least one of a number of beams, a beam width, or a periodicity. In one aspect, the KAS and SSB circuitry 1942 can provide a means to configure the communication and processing circuitry 1940 to receive the first and second SSB bursts.

In some aspects, the first SSB burst can be a KAS burst or reduced SSB burst that can be used as a KAS as described herein. In some aspects, the KAS and SSB circuitry 1942 can provide a means to configure the periodicity, beam width, beam sweeping pattern, repetition pattern, and/or transmit power of the SSB bursts. In one aspect, the UE can receive the first SSB burst at a first periodicity, and receive the second SSB burst at a second periodicity that is longer than the first periodicity. In one aspect, the first SSB burst has a fewer number of beams and a shorter periodicity than the second SSB burst. In one aspect, at least one beam of the first SSB burst has a wider beam width than one or more beams of the second SSB burst.

In one aspect, the first SSB burst includes N beams, and the second SSB burst includes M (M>N) beams. The initial N beams of the second SSB burst can be the same as the N beams of the first SSB burst in terms of at least one of a beam width and a periodicity. In one aspect, the first SSB burst (e.g., KAS burst) can provide assistance information to help the UE in detecting and receiving the second SSB burst (e.g., full SSB burst). In some aspects, the assistance information may include at least one of: a power offset of the first SSB burst relative to the second SSB burst; a beam sweeping pattern of the first SSB burst and a beam sweeping pattern of the second SSB burst; QCL relation information between the first SSB burst and the second SSB burst; a periodicity of the first SSB burst and a periodicity of the second SSB burst; or a timing offset of the first SSB burst relative to the second SSB burst.

In one configuration, the UE 1900 for wireless communication includes means for receiving SSB and KAS bursts described herein. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, 3, 5, 6, 8, and/or 12, and utilizing, for example, the processes and/or algorithms described herein in relation to FIGS. 8-14, and/or 20-22.

Several aspects of a wireless communication network have been presented with reference to an exemplary implementation. As those skilled in the art will readily appreciate, various aspects described throughout this disclosure may be extended to other telecommunication systems, network architectures and communication standards.

A first aspect of the present disclosure provides a network entity for a wireless communication network. The network entity comprises: a memory; and a processor coupled to the memory, wherein the processor is configured to: send a keep-alive signal (KAS) periodically; and send a periodic synchronization signal after sending a plurality of KASs and skipping the KAS in a period for sending the periodic synchronization signal, the KAS consuming less communication resources than the periodic synchronization signal.

In a second aspect, alone or in combination with the first aspect, wherein: the periodic synchronization signal comprises a synchronization signal block (SSB) including a primary synchronization signal (PSS) and a secondary synchronization signal (SSS); and the KAS comprises the PSS, excluding the SSS.

In a third aspect, alone or in combination with the second aspect, wherein the KAS comprises a repetition of the PSS across a plurality of symbols of the KAS.

In a fourth aspect, alone or in combination with the first aspect, wherein the KAS is configured to indicate a presence of a cell associated with the network entity in an energy saving mode.

In a fifth aspect, alone or in combination with any of the first to fourth aspects, wherein the processor is further configured to: transmit the KAS using a first transmit power; and transmit the periodic synchronization signal using a second transmit power that is different from the first transmit power.

In a sixth aspect, alone or in combination with any of the first to fourth aspects, wherein the processor is further configured to: send a KAS configuration, the KAS configuration comprising at least one of: a power offset of the KAS relative to the periodic synchronization signal; a beam sweeping pattern of the KAS and a beam sweeping pattern of the periodic synchronization signal; a KAS repetition indication; quasi co-location relation information between the KAS and the periodic synchronization signal; a periodicity of the KAS and a periodicity of the periodic synchronization signal; or a timing offset of the KAS relative to the periodic synchronization signal.

In a seventh aspect, alone or in combination with the sixth aspect, wherein the KAS includes the KAS configuration configured to assist a user equipment in detecting the periodic synchronization signal.

In an eighth aspect, alone or in combination with the sixth aspect, wherein the processor is further configured to: send the KAS configuration to a different network entity.

In a ninth aspect, alone or in combination with any of the first and fourth aspects, wherein the processor is further configured to: send the periodic synchronization signal using a first beam sweeping pattern; and send the KAS using a second beam sweeping pattern that is different from the first beam sweeping pattern in terms of at least one of a number of beams, a beam width, or a periodicity.

In a tenth aspect, alone or in combination with the ninth aspect, wherein: the first beam sweeping pattern comprises a first number of beams; the second beam sweeping pattern comprises a second number of beams that are fewer than the first number of beams; and at least one of the first number of beams has a wider beam width than one or more beams of the second number of beams.

In an eleventh aspect, alone or in combination with the ninth aspect, wherein: the periodic synchronization signal comprises more beams than the KAS; and initial N beams of the periodic synchronization signal are the same as initial N beams of the KAS in terms of at least one of a beam width and a periodicity.

A twelfth aspect of the present disclosure provides a method for wireless communication at a network entity. The method includes: sending a keep-alive signal (KAS) periodically; and sending a periodic synchronization signal after sending a plurality of KASs and skipping the KAS in a period for sending the periodic synchronization signal, the KAS consuming less communication resources than the periodic synchronization signal.

In a thirteenth aspect, alone or in combination with the twelfth aspect, wherein: the periodic synchronization signal comprises a synchronization signal block (SSB) including a primary synchronization signal (PSS) and a secondary synchronization signal (SSS); and the KAS comprises the PSS, excluding the SSS.

In a fourteenth aspect, alone or in combination with the twelfth aspect, the method further comprises: sending the periodic synchronization signal using a first beam sweeping pattern; and sending the KAS using a second beam sweeping pattern that is different from the first beam sweeping pattern in terms of at least one of a number of beams, a beam width, or a periodicity, the KAS configured to indicate a presence of a cell associated with the network entity in an energy saving mode.

In a fifteenth aspect, alone or in combination with any of the twelfth, thirteenth, and fourteenth aspects, the method further comprises sending a KAS configuration, the KAS configuration comprising at least one of: a power offset of the KAS relative to the periodic synchronization signal; a beam sweeping pattern of the KAS and a beam sweeping pattern of the periodic synchronization signal; a KAS repetition indication; quasi co-location relation information between the KAS and the periodic synchronization signal; a periodicity of the KAS and a periodicity of the periodic synchronization signal; or a timing offset of the KAS relative to the periodic synchronization signal.

A sixteenth aspect of the present disclosure provides a user equipment (UE) for wireless communication. The UE comprises: a memory; a transceiver for wireless communication; and a processor coupled to the memory and the transceiver, wherein the processor is configured to: receive a keep-alive signal (KAS) periodically; and receive a periodic synchronization signal after receiving a plurality of KASs and skipping the KAS in a period for receiving the periodic synchronization signal, the KAS consuming less communication resources than the periodic synchronization signal.

In a seventeenth aspect, alone or in combination with the sixteenth aspect, wherein the periodic synchronization signal comprises a synchronization signal block (SSB) including a primary synchronization signal (PSS) and a secondary synchronization signal (SSS); and the KAS comprises the PSS, excluding the SSS.

In an eighteenth aspect, alone or in combination with the seventeenth aspect, wherein the KAS comprises a repetition of the PSS across a plurality of symbols of the KAS.

In a nineteenth aspect, alone or in combination with the sixteenth aspect, wherein the KAS is configured to indicate a presence of a cell associated with a network entity in an energy saving mode.

In a twentieth aspect, alone or in combination with any of the sixteenth to nineteenth aspects, wherein the processor is further configured to: receive the KAS with a first transmit power; and receive the periodic synchronization signal with a second transmit power that is different from the first transmit power.

In a twenty-first aspect, alone or in combination with any of the sixteenth to nineteenth aspects, wherein the processor is further configured to: receive a KAS configuration, the KAS configuration comprising at least one of: a power offset of the KAS relative to the periodic synchronization signal; a beam sweeping pattern of the KAS and a beam sweeping pattern of the periodic synchronization signal; a KAS repetition indication; quasi co-location relation information between the KAS and the periodic synchronization signal; a periodicity of the KAS and a periodicity of the periodic synchronization signal; or a timing offset of the KAS relative to the periodic synchronization signal.

In a twenty-second aspect, alone or in combination with the twenty-first aspect, wherein the KAS includes the KAS configuration configured to assist the UE in detecting the periodic synchronization signal.

In a twenty-third aspect, alone or in combination with the twenty-first aspect, wherein the processor is further configured to: receive the KAS configuration from a different network entity.

In a twenty-fourth aspect, alone or in combination with the sixteenth aspect, wherein the processor is further configured to: receive the periodic synchronization signal using a first beam sweeping pattern; and receive the KAS using a second beam sweeping pattern that is different from the first beam sweeping pattern in terms of at least one of a number of beams, a beam width, or a periodicity.

In a twenty-fifth aspect, alone or in combination with the twenty-fourth aspect, wherein: the first beam sweeping pattern comprises a first number of beams; the second beam sweeping pattern comprises a second number of beams that are fewer than the first number of beams; and at least one of the first number of beams has a wider beam width than one or more beams of the second number of beams.

In a twenty-sixth aspect, alone or in combination with the twenty-fourth aspect, wherein: the periodic synchronization signal comprises more beams than the KAS; and initial N beams of the periodic synchronization signal are the same as initial N beams of the KAS in terms of at least one of a beam width and a periodicity.

A twenty-seventh aspect of the present disclosure provides a method for wireless communication at a user equipment (UE). The method comprises: receiving a keep-alive signal (KAS) periodically; and receiving a periodic synchronization signal after receiving a plurality of KASs and skipping the KAS in a period for receiving the periodic synchronization signal, the KAS consuming less communication resources than the periodic synchronization signal.

In a twenty-eighth aspect, alone or in combination with the twenty-seventh, wherein: the periodic synchronization signal comprises a synchronization signal block (SSB) including a primary synchronization signal (PSS) and a secondary synchronization signal (SSS); and the KAS comprises the PSS, excluding the SSS.

In a twenty-ninth aspect, alone or in combination with the twenty-seventh, the method further comprises: receiving the periodic synchronization signal using a first beam sweeping pattern; and receiving the KAS using a second beam sweeping pattern that is different from the first beam sweeping pattern in terms of at least one of a number of beams, a beam width, or a periodicity, the KAS configured to indicate a presence of a cell associated with a network entity in an energy saving mode.

In a thirtieth aspect, alone or in combination with the twenty-seventh, twenty-eighth, and thirtieth aspects, the method further comprises receiving a KAS configuration, the KAS configuration comprising at least one of: a power offset of the KAS relative to the periodic synchronization signal; a beam sweeping pattern of the KAS and a beam sweeping pattern of the periodic synchronization signal; a KAS repetition indication; quasi co-location relation information between the KAS and the periodic synchronization signal; a periodicity of the KAS and a periodicity of the periodic synchronization signal; or a timing offset of the KAS relative to the periodic synchronization signal.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the $3^{rd}$ Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network entity for a wireless communication network, comprising:

a memory; and one or more processors coupled to the memory, wherein the one or more processors are configured to:

send a keep-alive signals (KAS) periodically, the KAS being configured to indicate a presence of a cell associated with the network entity in an energy saving mode; and send a periodic synchronization signal after sending a plurality of KASs in one or more previous periods, and skipping the KAS in a period in which the periodic synchronization signal is sent, the KAS consuming less communication resources than the periodic synchronization signal.

2. The network entity of claim 1, wherein:

the periodic synchronization signal comprises a synchronization signal block (SSB) including a primary synchronization signal (PSS) and a secondary synchronization signal (SSS); and the KAS comprises the PSS, excluding the SSS.

3. The network entity of claim 2, wherein the KAS comprises a repetition of the PSS across a plurality of symbols of the KAS.

4. The network entity of claim 1, wherein the one or more processors are further configured to:

transmit the KAS using a first transmit power; and transmit the periodic synchronization signal using a second transmit power that is different from the first transmit power.

5. The network entity of claim 1, wherein the one or more processors are further configured to:

send a KAS configuration, the KAS configuration comprising at least one of:

a power offset of the KAS relative to the periodic synchronization signal;

a beam sweeping pattern of the KAS and a beam sweeping pattern of the periodic synchronization signal;

a KAS repetition indication;

quasi co-location relation information between the KAS and the periodic synchronization signal;

a periodicity of the KAS and a periodicity of the periodic synchronization signal; or a timing offset of the KAS relative to the periodic synchronization signal.

6. The network entity of claim 5, wherein the KAS includes the KAS configuration configured to assist a user equipment in detecting the periodic synchronization signal.

7. The network entity of claim 5, wherein the one or more processors are further configured to:

send the KAS configuration to a different network entity.

8. The network entity of claim 1, wherein the one or more processors are further configured to:

send the periodic synchronization signal using a first beam sweeping pattern; and send the KAS using a second beam sweeping pattern that is different from the first beam sweeping pattern in terms of at least one of a number of beams, a beam width, or a periodicity.

9. The network entity of claim 8, wherein:

the first beam sweeping pattern comprises a first number of beams;

the second beam sweeping pattern comprises a second number of beams that are fewer than the first number of beams; and at least one of the first number of beams has a wider beam width than one or more beams of the second number of beams.

10. The network entity of claim 8, wherein:

the periodic synchronization signal comprises more beams than the KAS; and initial N beams of the periodic synchronization signal are the same as initial N beams of the KAS in terms of at least one of a beam width and a periodicity.

11. A method for wireless communication at a network entity, comprising:

sending a keep-alive signal (KAS) periodically, the KAS being configured to indicate a presence of a cell associated with the network entity in an energy saving mode; and sending a periodic synchronization signal after sending a plurality of KASs in one or more previous periods, and skipping the KAS in a period in which the periodic synchronization signal is sent, the KAS consuming less communication resources than the periodic synchronization signal.

12. The method of claim 11, wherein:

the periodic synchronization signal comprises a synchronization signal block (SSB) including a primary synchronization signal (PSS) and a secondary synchronization signal (SSS); and the KAS comprises the PSS, excluding the SSS.

13. The method of claim 11, further comprising:

sending the periodic synchronization signal using a first beam sweeping pattern; and sending the KAS using a second beam sweeping pattern that is different from the first beam sweeping pattern in terms of at least one of a number of beams, a beam width, or a periodicity.

14. The method of claim 11, further comprising sending a KAS configuration, the KAS configuration comprising at least one of:

a power offset of the KAS relative to the periodic synchronization signal;

a beam sweeping pattern of the KAS and a beam sweeping pattern of the periodic synchronization signal;

a KAS repetition indication;

quasi co-location relation information between the KAS and the periodic synchronization signal;

a periodicity of the KAS and a periodicity of the periodic synchronization signal; or a timing offset of the KAS relative to the periodic synchronization signal.

15. A user equipment (UE) for wireless communication, comprising:

a memory;

a transceiver for wireless communication; and one or more processors coupled to the memory and the transceiver, wherein the one or more processors are configured to:

receive a keep-alive signal (KAS) periodically, the KAS being configured to indicate a presence of a cell associated with a network entity in an energy saving mode; and receive a periodic synchronization signal after receiving a plurality of KASs in one or more previous periods, and skipping the KAS in a period in which the periodic synchronization signal is received, the KAS consuming less communication resources than the periodic synchronization signal.

16. The UE of claim 15, wherein the periodic synchronization signal comprises a synchronization signal block (SSB) including a primary synchronization signal (PSS) and a secondary synchronization signal (SSS); and the KAS comprises the PSS, excluding the SSS.

17. The UE of claim 16, wherein the KAS comprises a repetition of the PSS across a plurality of symbols of the KAS.

18. The UE of claim 15, wherein the one or more processors are further configured to:

receive the KAS with a first transmit power; and receive the periodic synchronization signal with a second transmit power that is different from the first transmit power.

19. The UE of claim 15, wherein the one or more processors are further configured to:

receive a KAS configuration, the KAS configuration comprising at least one of:

a power offset of the KAS relative to the periodic synchronization signal;

a beam sweeping pattern of the KAS and a beam sweeping pattern of the periodic synchronization signal;

a KAS repetition indication;

quasi co-location relation information between the KAS and the periodic synchronization signal;

a periodicity of the KAS and a periodicity of the periodic synchronization signal; or a timing offset of the KAS relative to the periodic synchronization signal.

20. The UE of claim 19, wherein the KAS includes the KAS configuration configured to assist the UE in detecting the periodic synchronization signal.

21. The UE of claim 19, wherein the one or more processors are further configured to:

receive the KAS configuration from a different network entity.

22. The UE of claim 15, wherein the one or more processors are further configured to:

receive the periodic synchronization signal using a first beam sweeping pattern; and receive the KAS using a second beam sweeping pattern that is different from the first beam sweeping pattern in terms of at least one of a number of beams, a beam width, or a periodicity.

23. The UE of claim 22, wherein:

the first beam sweeping pattern comprises a first number of beams;

the second beam sweeping pattern comprises a second number of beams that are fewer than the first number of beams; and at least one of the first number of beams has a wider beam width than one or more beams of the second number of beams.

24. The UE of claim 22, wherein:

the periodic synchronization signal comprises more beams than the KAS; and initial N beams of the periodic synchronization signal are the same as initial N beams of the KAS in terms of at least one of a beam width and a periodicity.

25. A method for wireless communication at a user equipment (UE), comprising:

receiving a keep-alive signal (KAS) periodically, the KAS being configured to indicate a presence of a cell associated with a network entity in an energy saving mode; and receiving a periodic synchronization signal after receiving a plurality of KASs in one or more previous periods, and skipping the KAS in a period in which the periodic synchronization signal is received, the KAS consuming less communication resources than the periodic synchronization signal.

26. The method of claim 25, wherein:

the periodic synchronization signal comprises a synchronization signal block (SSB) including a primary synchronization signal (PSS) and a secondary synchronization signal (SSS); and the KAS comprises the PSS, excluding the SSS.

27. The method of claim 25, further comprising:

receiving the periodic synchronization signal using a first beam sweeping pattern; and receiving the KAS using a second beam sweeping pattern that is different from the first beam sweeping pattern in terms of at least one of a number of beams, a beam width, or a periodicity.

28. The method of claim 25, further comprising receiving a KAS configuration, the KAS configuration comprising at least one of:

a power offset of the KAS relative to the periodic synchronization signal;

a beam sweeping pattern of the KAS and a beam sweeping pattern of the periodic synchronization signal;

a KAS repetition indication;

quasi co-location relation information between the KAS and the periodic synchronization signal;

a periodicity of the KAS and a periodicity of the periodic synchronization signal; or a timing offset of the KAS relative to the periodic synchronization signal.

* * * * *